United States Patent
Steele, Jr. et al.

(10) Patent No.: US 6,631,421 B1
(45) Date of Patent: Oct. 7, 2003

(54) RECURSIVE PARTITIONING OF NETWORKS

(75) Inventors: Guy L. Steele, Jr., Lexington, MA (US); Steven K. Heller, Chelmsford, MA (US); Daniel Cassiday, Topsfield, MA (US); Jon Wade, Wellesley, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/323,965

(22) Filed: Jun. 2, 1999

(51) Int. Cl.[7] .................. G06F 15/173; G06F 15/00
(52) U.S. Cl. ............................. 709/249; 712/13
(58) Field of Search ............... 709/242; 712/13

(56) References Cited

U.S. PATENT DOCUMENTS

| | | |
|---|---|---|
| 5,128,932 A | 7/1992 | Li |
| 5,453,978 A | 9/1995 | Sethu et al. |
| 5,602,839 A | 2/1997 | Annapareddy et al. |
| 5,680,116 A | 10/1997 | Hashimoto et al. |
| 5,721,819 A | 2/1998 | Galles et al. |
| 5,740,346 A | 4/1998 | Wicki et al. |
| 5,751,710 A | 5/1998 | Crowther et al. |
| 5,751,967 A | 5/1998 | Raab et al. |
| 5,768,501 A | 6/1998 | Lewis |
| 5,781,546 A | 7/1998 | Sethu |

(List continued on next page.)

FOREIGN PATENT DOCUMENTS

EP 0817097 A2 * 6/1997

OTHER PUBLICATIONS

Peercy, M. et al., "Distributed Algorithms for Shortest–Path, Deadlock–Free Routing and Broadcasting in Arbitrarily Faulty Hypercubes," International Symposium on Fault Tolerant Computing Systems (FTCS), US, Los Alamitos, IEEE Comp. Soc. Press, vol. Symp. 20, Jun. 26, 1990, pp. 218–225.

Fleury, E. et al., "A General Theory for Deadlock Avoidance in Wormhole–Routed Networks," IEEE Trans. on Parallel and Distributed Systems, IEEE Inc., NY, vol. 9, No. 7, Jul. 1, 1998, pp. 626–638.

Pifarre G. D. et al., "Adaptive Deadlock–and Livelock–Free Routing in the Hypercube Network," IEEE Trans. on Parallel and Distributed Systems, IEEE Inc., NY, vol. 5, No. 11, Nov. 1, 1994, pp. 1121–1138.

Whay C. Lee, "Topology Aggregation for Hierarchical Routing in ATM Networks", Apr. 1, 1995, pp. 82–92, Computer–Communication Review.

IBM, "Clustering Algorithm for Computer Network Management Graphics", Jun. 1988, pp. 71–79, IBM Technical Disclosure Bulletin, vol. 31, No. 1.

*Primary Examiner*—Andrew Caldwell
(74) *Attorney, Agent, or Firm*—Finnegan, Henderson, Farabow, Garrett & Dunner, L.L.P.

(57) ABSTRACT

Methods and systems consistent with the present invention provide a family of networks ranging from 2 nodes to 16 nodes that can be partitioned in an unconstrained manner. That is, where the number of nodes in one of these networks is N, subnetwork can contain any number of nodes from 1 to N–1 as long as the total number of nodes in both subnetworks equals N. Furthermore, each subnetwork can be partitioned repeatedly until reaching the atomic level (i.e., when the subnetwork contains a single node). In accordance with methods and systems consistent with the present invention, when a network is partitioned, each subnetwork has various desirable properties. For example, the maximum path length between any two nodes in each subnetwork nodes is 3, and each to subnetwork has a set of deadlock-free routings.

16 Claims, 48 Drawing Sheets

U.S. PATENT DOCUMENTS

| | | |
|---|---|---|
| 5,812,549 A | 9/1998 | Sethu |
| 5,859,981 A | 1/1999 | Levin et al. |
| 5,874,964 A | 2/1999 | Gille |
| 5,884,047 A | 3/1999 | Aikawa et al. |
| 5,914,953 A | 6/1999 | Krause et al. |
| 5,970,232 A | 10/1999 | Passint et al. |
| 6,005,860 A | 12/1999 | Anderson et al. |
| 6,031,835 A | 2/2000 | Abali et al. |
| 6,055,618 A | 4/2000 | Thorson |
| 6,064,671 A | 5/2000 | Killian |
| 6,097,718 A | 8/2000 | Bion |
| 6,137,781 A | 10/2000 | Goto et al. |
| 6,230,252 B1 | 5/2001 | Passint et al. |
| 6,243,760 B1 | 6/2001 | Armbruster et al. |
| 6,256,295 B1 | 7/2001 | Callon |
| 6,295,573 B1 | 9/2001 | Bailey et al. |
| 6,437,804 B1 * | 8/2002 | Ibe et al. .................... 345/736 |

* cited by examiner

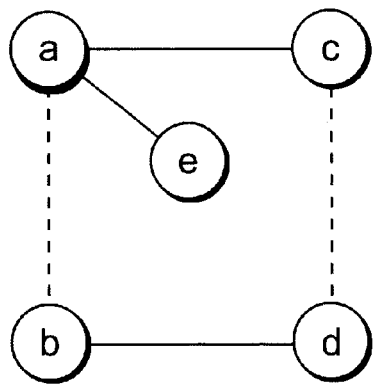
FIG. 8A
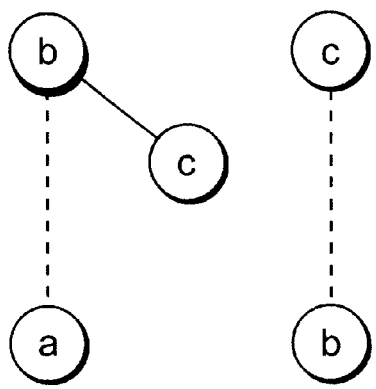 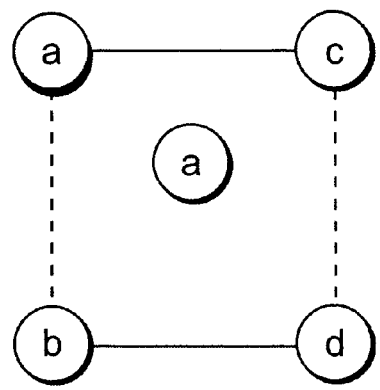
FIG. 8b                FIG. 8c

RECURSIVE PARTITIONING OF NETWORKS

RELATED APPLICATIONS

The following identified U.S. patent applications are relied upon and are incorporated by reference in this application.

U.S. patent application Ser. No. 09323,963, entitled "Improved Network Topologies," filed on even date herewith, assigned to a common assignee.

U.S. patent application Ser. No. 09/323,964, entitled "Dynamic Generation of Deadlock-Free Routings," filed on even date herewith, assigned to a common assignee.

U.S. patent application Ser. No. 09/323,962, entitled "Improved Network Reconfiguration," filed on even date herewith, assigned to a common assignee.

FIELD OF THE INVENTION

The present invention relates generally to data processing systems and, more particularly, to recursively partitioning networks.

BACKGROUND OF THE INVENTION

Networks comprise a number of nodes that are interconnected via links. As used herein, the term "node" refers to any device capable of communicating, such as a computer, router, switch, network processor, or symmetric multi-processor. The specific configuration of nodes and links in a network is referred to as the "network topology."

Some conventional networks may be partitioned into subnetworks. The "partitioning" of a network refers to subdividing the network into two subnetworks, each of which is independent of the other. The term "independent" refers to each link of the original network belonging to at most one of the two resulting subnetworks and each node of the original network belonging to at most one of the two resulting subnetworks.

Partitioning a network is desirable because it provides fault tolerance. That is, partitioning a network into two subnetworks ensures that the failure of a node in one subnetwork does not affect the other. For example, a node in one of the subnetworks may fail and become nonoperational. In this situation, although the failure affects performance of the subnetwork in which it resides because none of the other nodes can route traffic through the failed node, the other subnetwork remains unaffected by the failure.

Although conventional systems exist for partitioning a network, these systems partition the network in a restricted manner: each subnetwork is constrained as to the number of nodes that it contains. For example, in one conventional system, each subnetwork contains either one-half or one-fourth of the total number of nodes in the network. Similarly, another conventional system restricts the number of nodes in the network to a power of 2.

Although these conventional systems allow for partitioning, because the number of nodes in the subnetwork is constrained, these systems are inflexible, which can lead to the under utilization of resources. For example, in the conventional system where each subnetwork contains either one-half or one-fourth of the total number of nodes, if the total number of nodes were 16 and the system administrator needed a subnetwork of only 3 nodes to run a particular set of programs, the administrator would be restricted to dividing the network into two subnetworks of 8 nodes or a subnetwork of 4 nodes and a subnetwork of 12 nodes. In either case, at least one node goes underutilized. It is therefore desirable to improve the partitioning of networks.

SUMMARY OF THE INVENTION

Methods and systems consistent with the present invention provide a family of networks ranging from 2 nodes to 16 nodes that can be partitioned in an unconstrained manner. That is, where the number of nodes in one of these networks is N, each subnetwork can contain any number of nodes from 1 to N−1 as long as the total number of nodes in both subnetworks equals N. Furthermore, each subnetwork can be partitioned repeatedly until reaching the atomic level (i.e., when the subnetwork contains a single node). In accordance with methods and systems consistent with the present invention, when a network is partitioned, each subnetwork has various desirable properties. For example, the maximum path length between any two nodes in each subnetwork is 3, and each subnetwork has a set of deadlock-free routings.

In accordance with methods consistent with the present invention, a method is provided in a data processing system with a number of nodes N, where N is greater than 4. This method receives an indication of a first number of nodes and a second number of nodes. The first number of nodes and the second number of nodes are capable of being any number from 1 to N−1 as long as the sum of the first number of nodes and the second number of nodes is N. Furthermore, the method partitions the nodes into a first subnetwork having the first number of nodes and a second subnetwork having the second number of nodes.

In accordance with methods consistent with the present invention, a method is provided that provides a network that has nodes and a plurality of the nodes are partner nodes having a partnership relationship. Furthermore, the method partitions the network into a plurality of subnetworks such that the partnership relationship between the partner nodes remains intact.

In accordance with methods consistent with the present invention, a method is provided in a distributed system having a network of nodes. This method partitions the network into a plurality of subnetworks, provides each of the subnetworks with a routing table that avoids deadlock, and routes traffic through each of the subnetworks using the provided routing tables such that deadlock is avoided.

In accordance with systems consistent with the present invention, an administrative node of a network is provided. The network contains a number of nodes N, where N is greater than 4. This administrative node contains a memory and a processor. The memory comprises routing software with first code that receives an indication of a first number of nodes and an indication of a second number of nodes, the first number and the second number being unconstrained such that the first number and the second number are capable of being any number between 1 and N−1 as long as the first number and the second number sum to N. The routing software also contains second code for partitioning the network into a first partition with the first number of nodes and a second partition with the second number of nodes. The processor runs the routing software.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

FIG. 8A depicts a network with 5 nodes in accordance with methods and systems consistent with the present invention;

FIGS. 8B and 8C depict partitionings of the network in FIG. 8A;

Figure 17A:
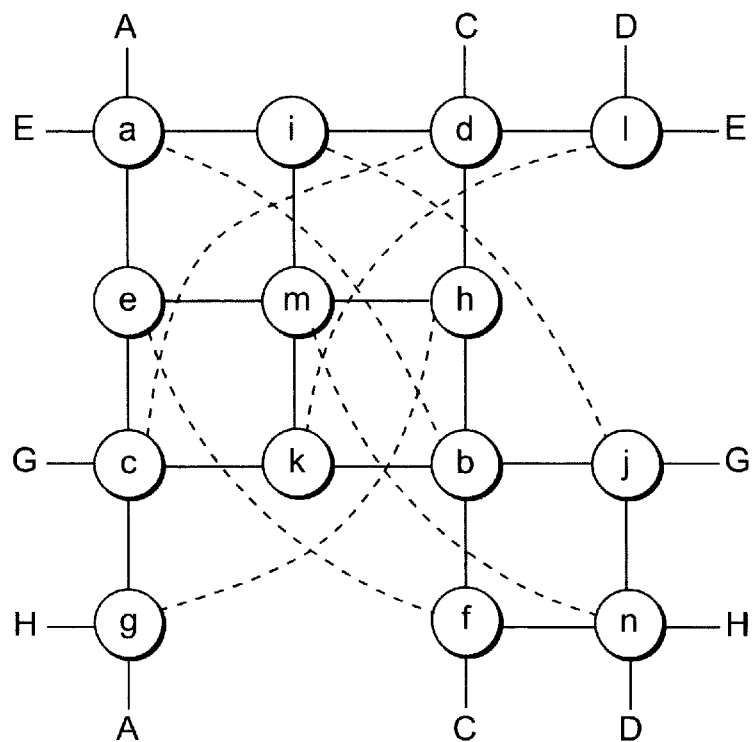
Figure 17B:
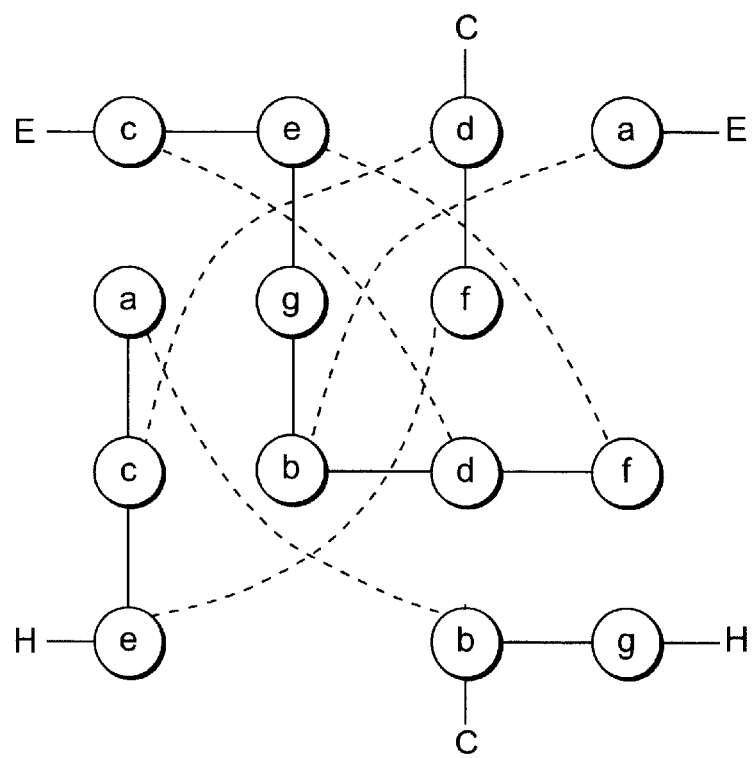
Figure 17C:
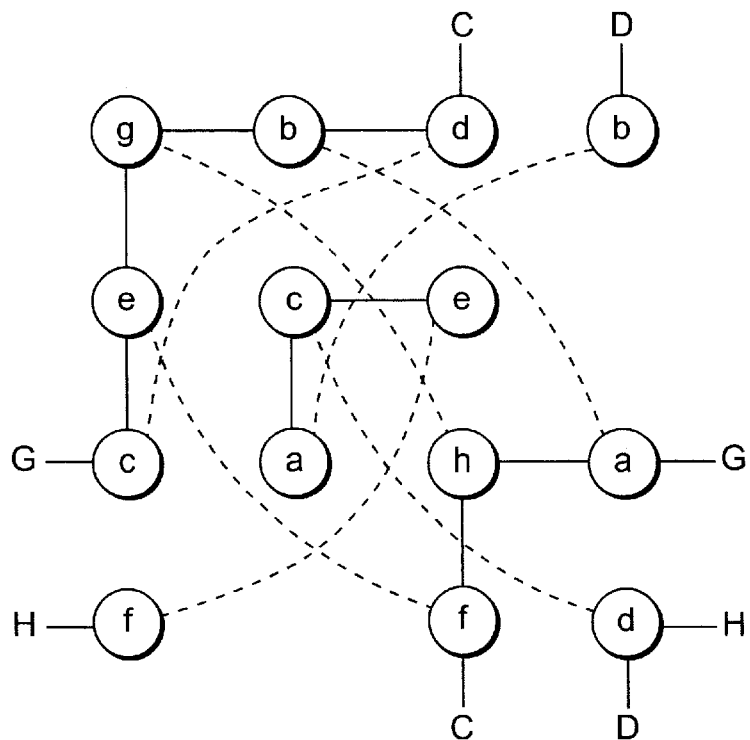
Figure 17D:
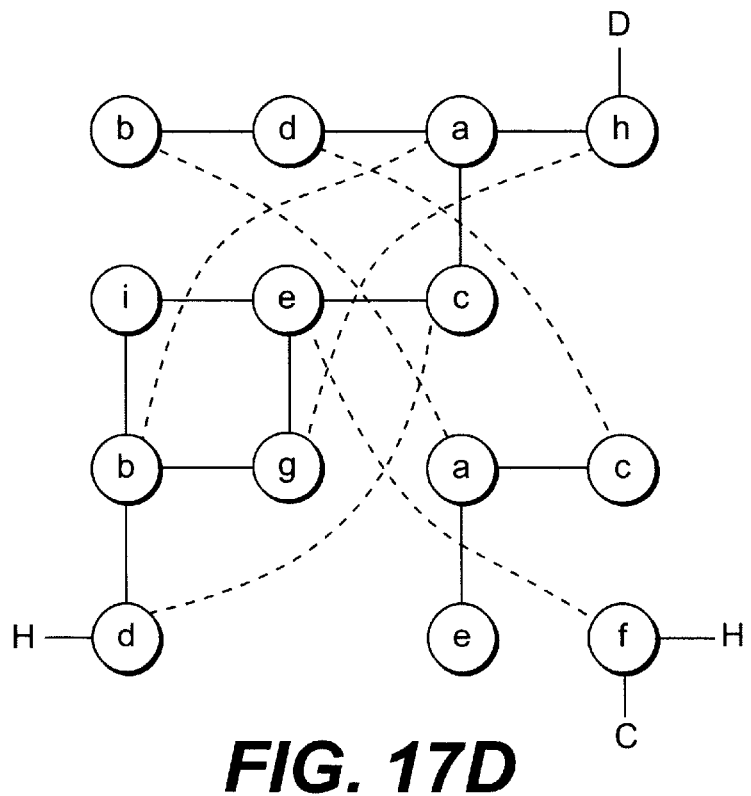
Figure 17E:
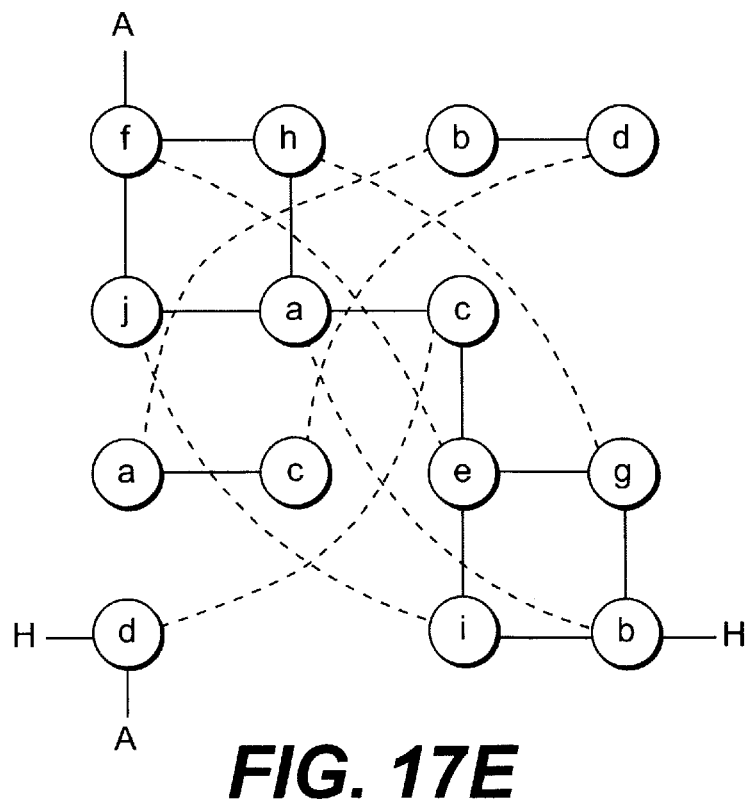
Figure 17F:
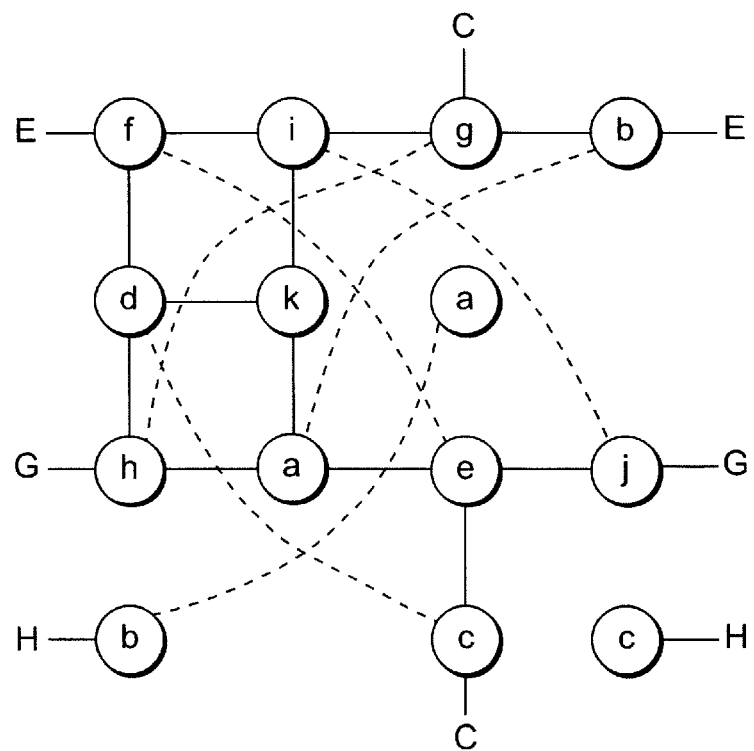
Figure 17G:
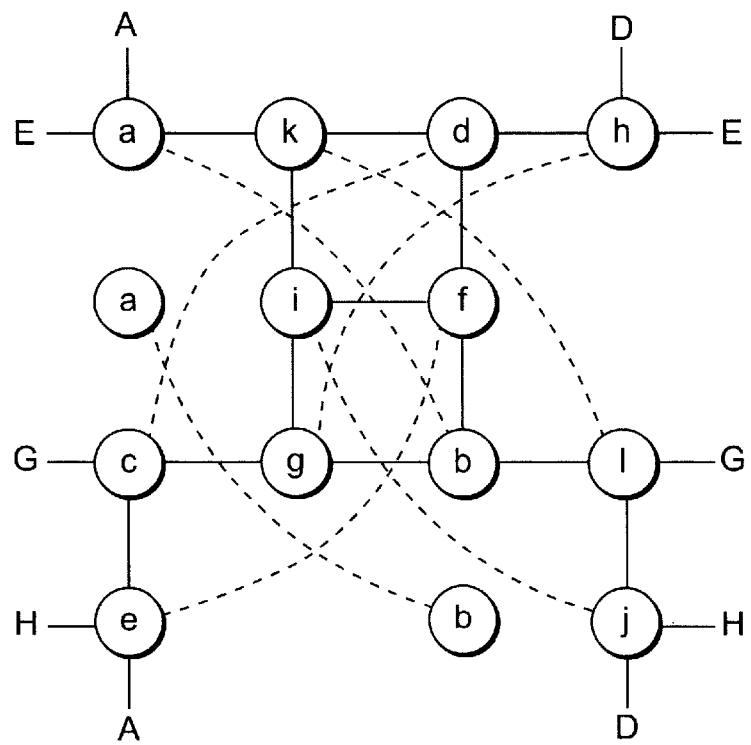
Figure 17H:
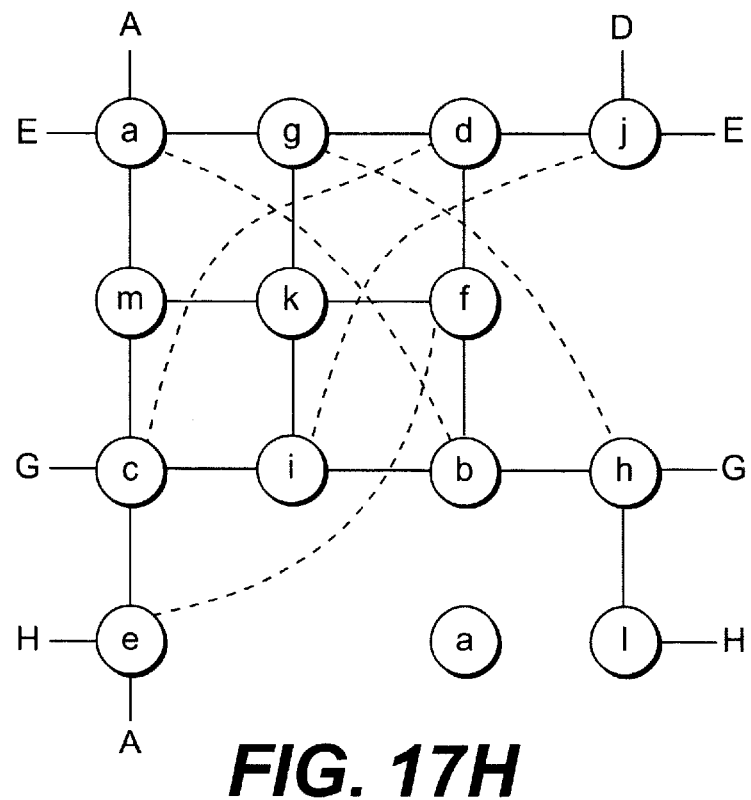
Figure 18A:
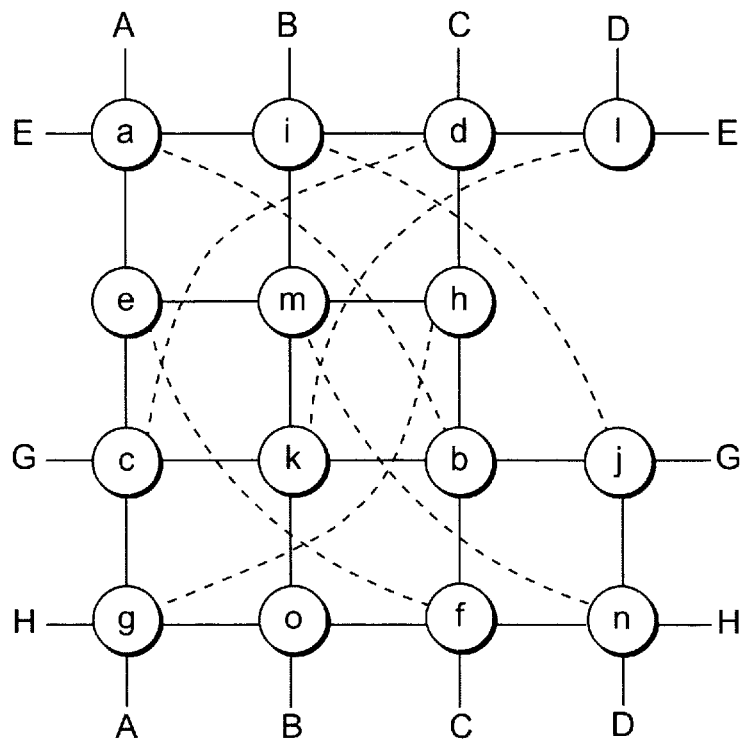
Figure 18B:
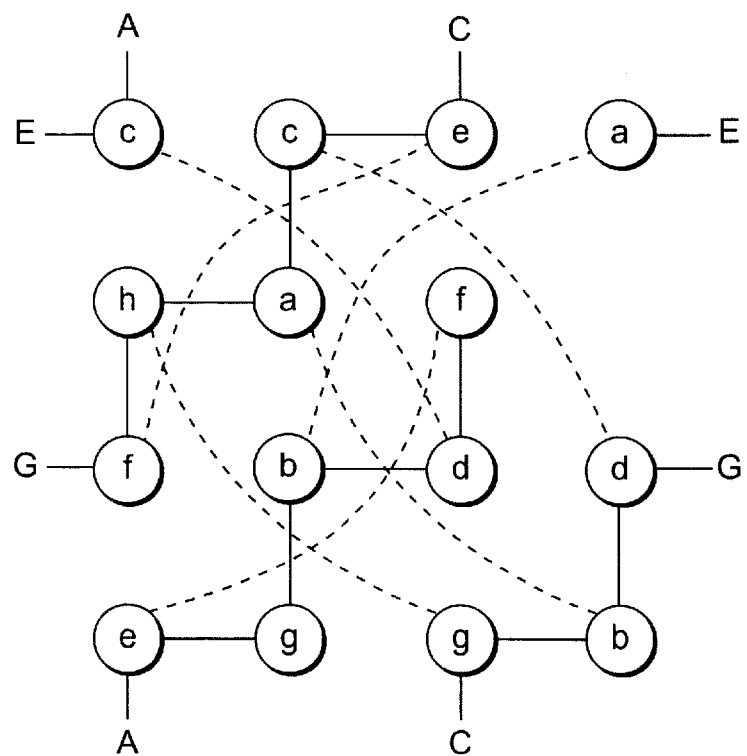
Figure 18C:
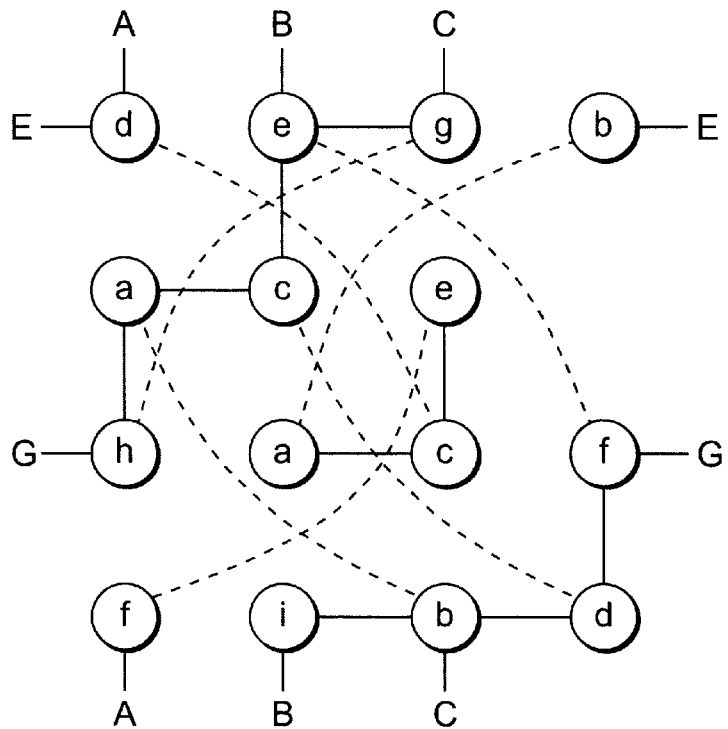
Figure 18D:
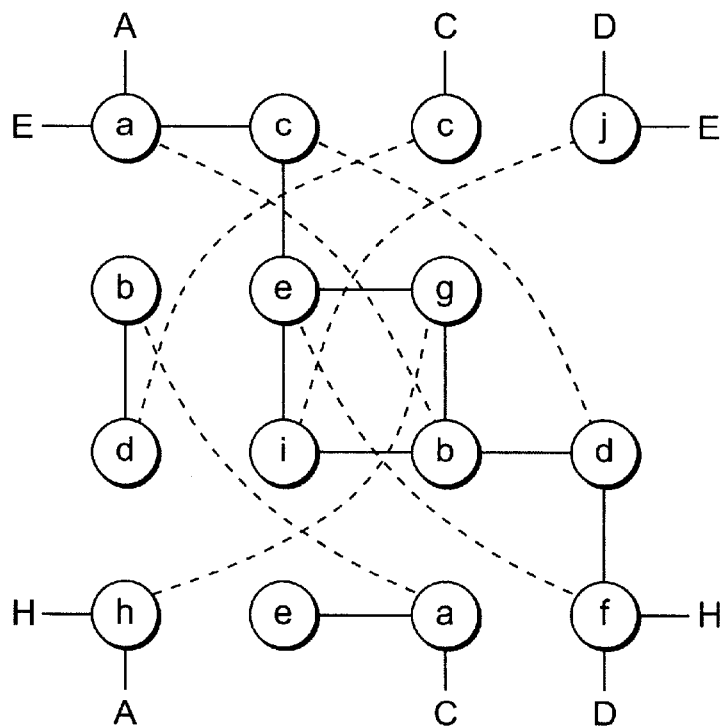
Figure 18E:
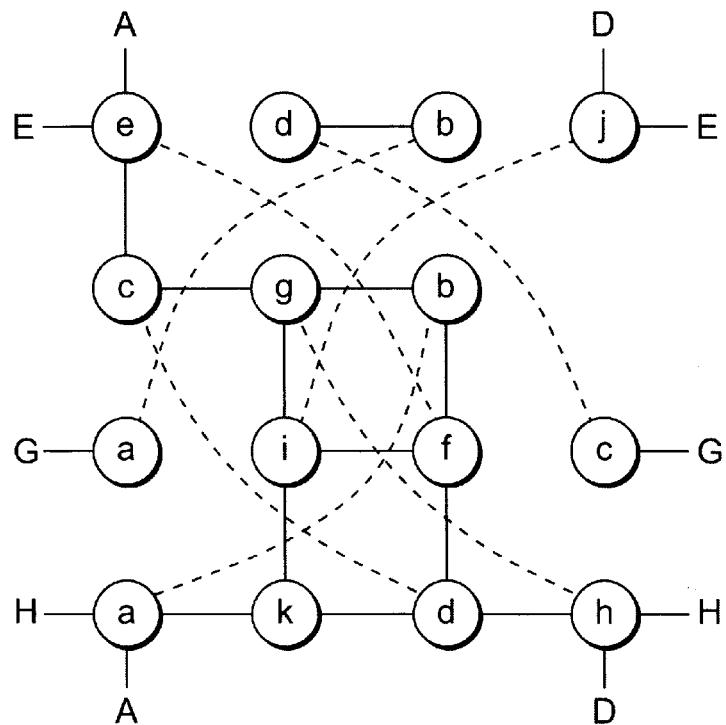
Figure 18F:
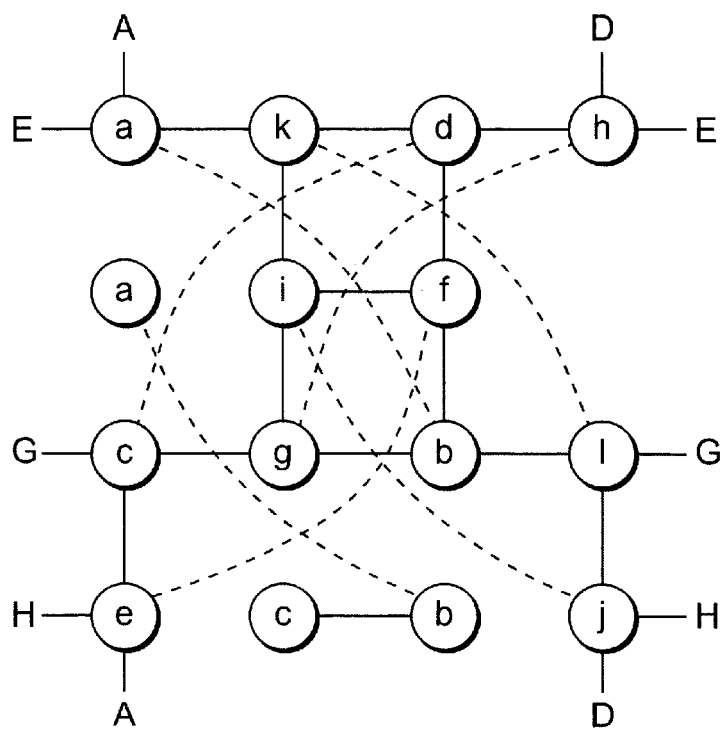
Figure 18G:
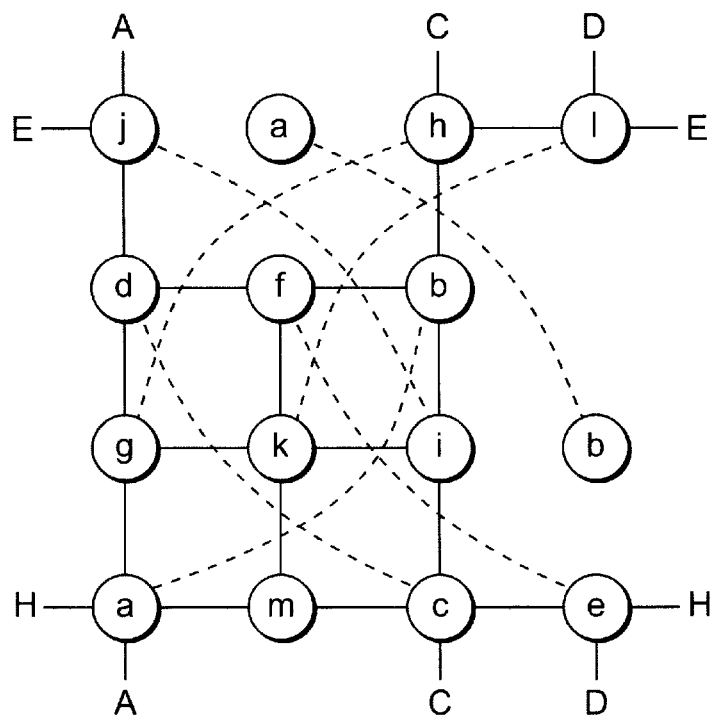
Figure 18H:
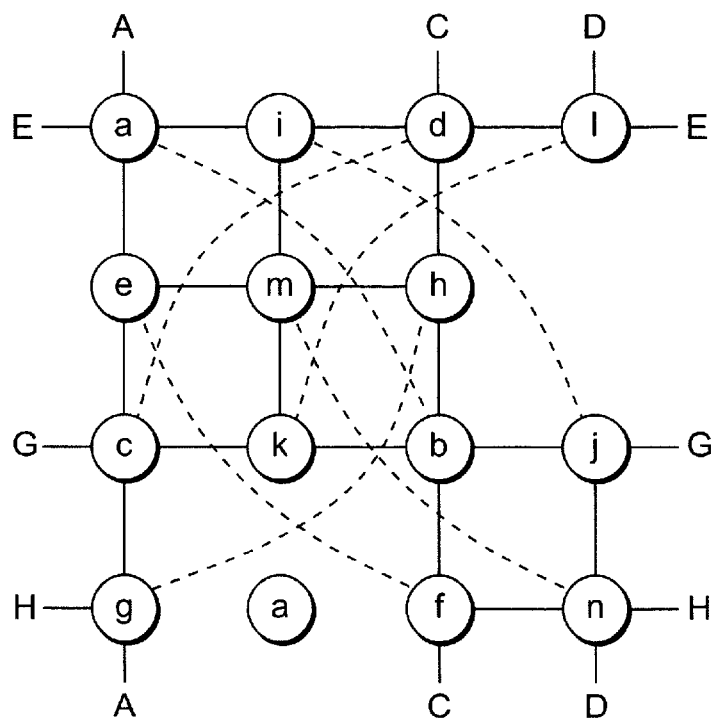
Figure 19A:
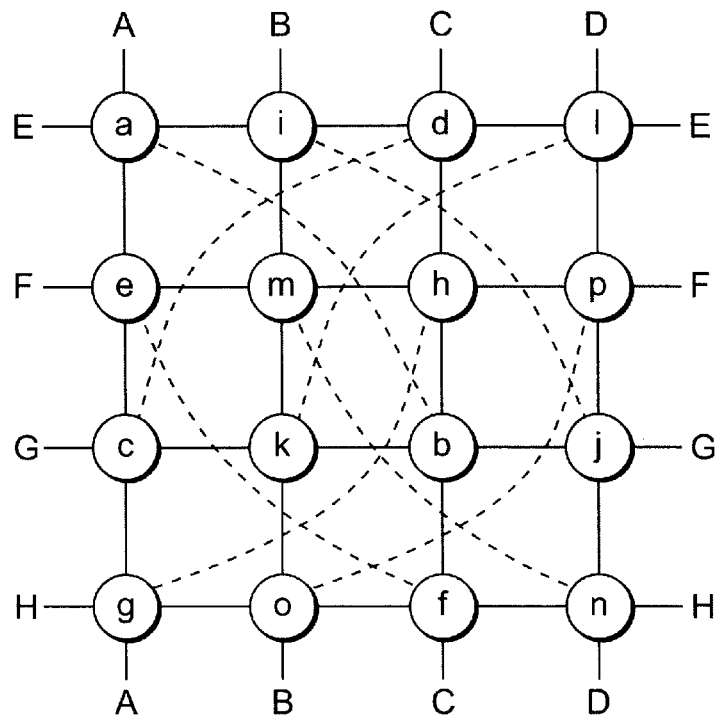
Figure 19B:
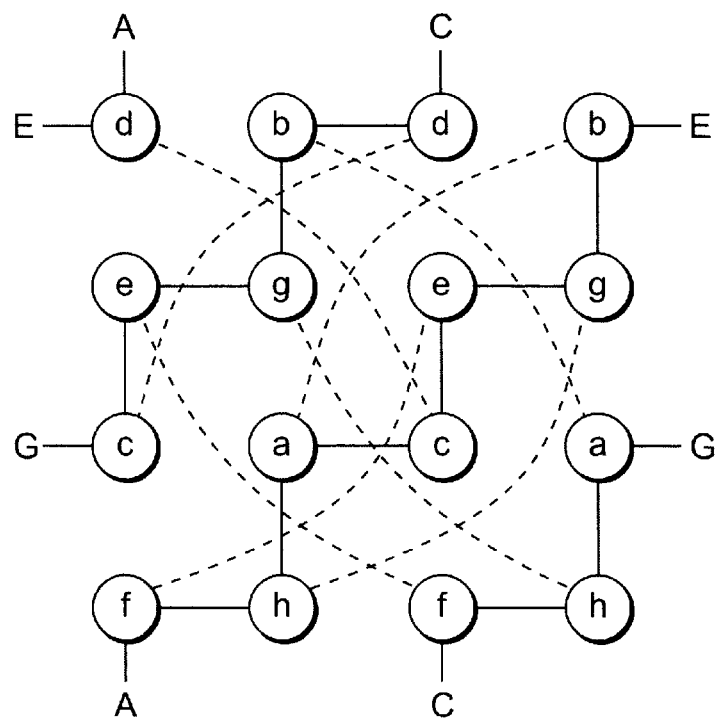
Figure 19C:
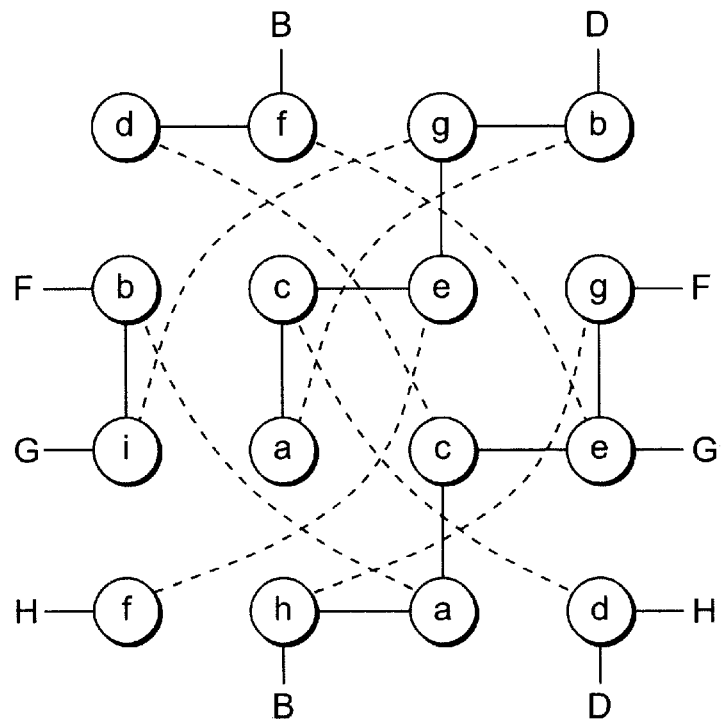
Figure 19D:
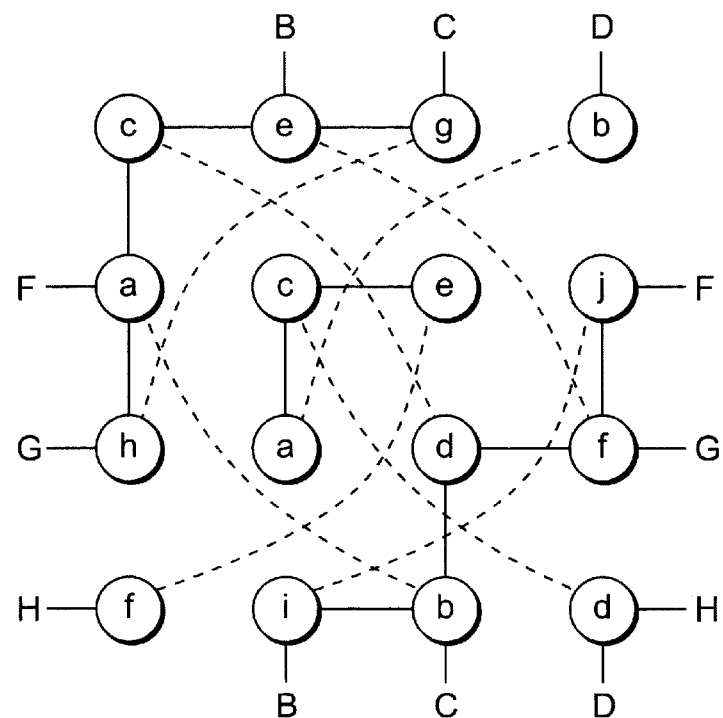
Figure 19E:
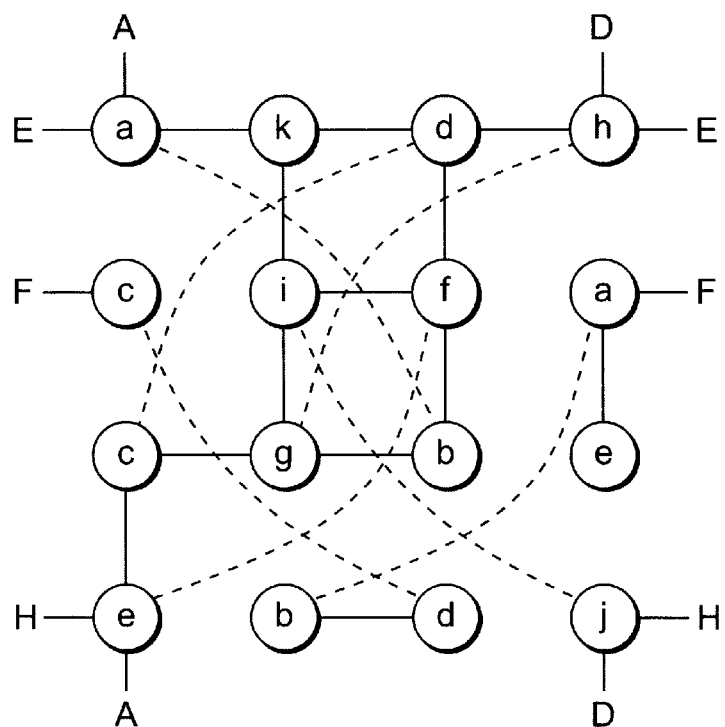
Figure 19F:
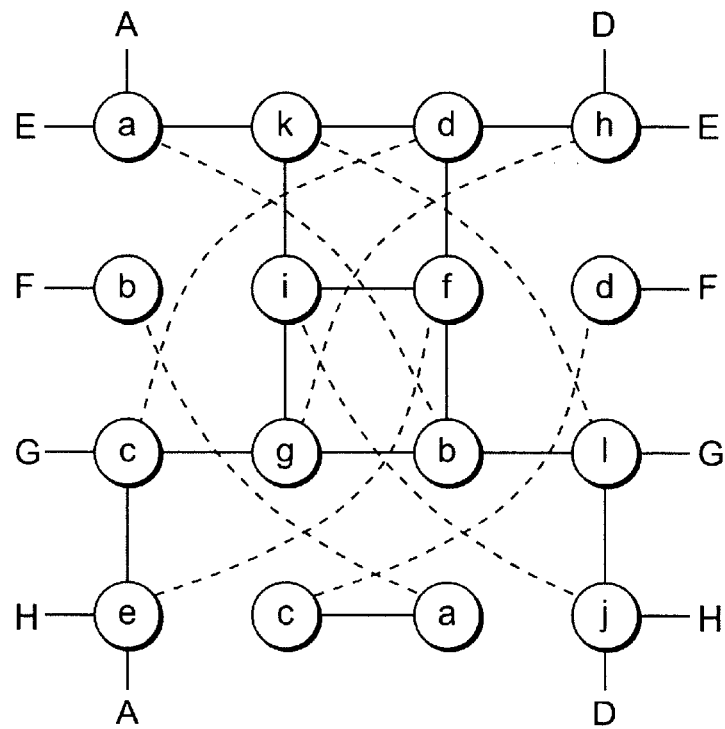
Figure 19G:
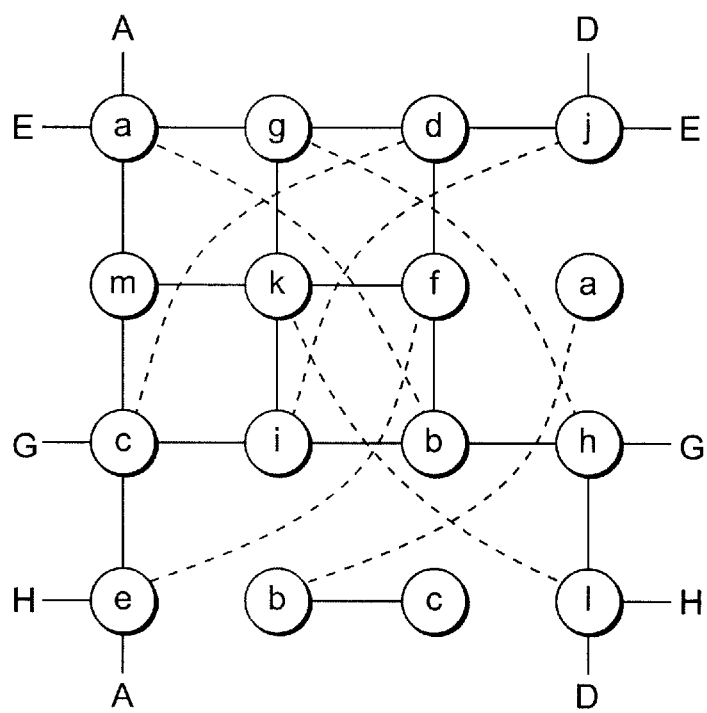
Figure 19H:
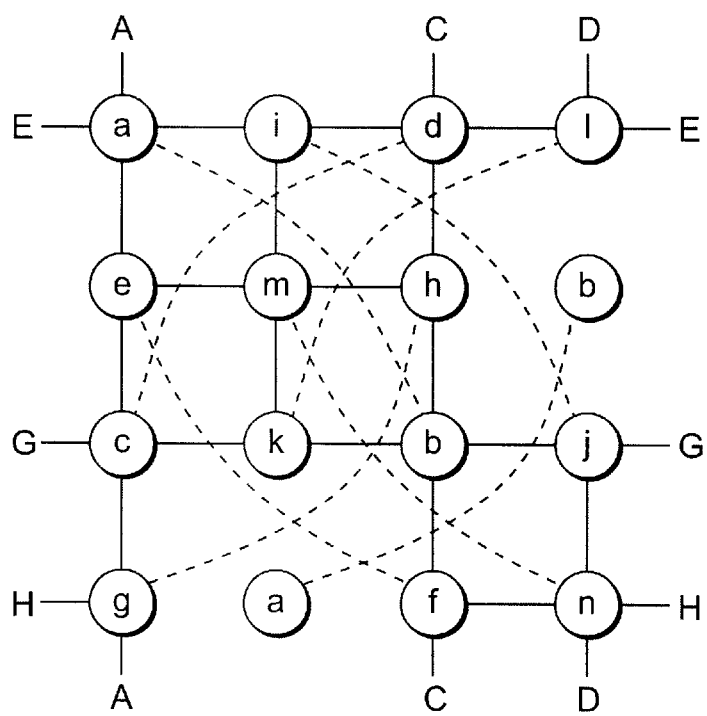
Figure 19I:
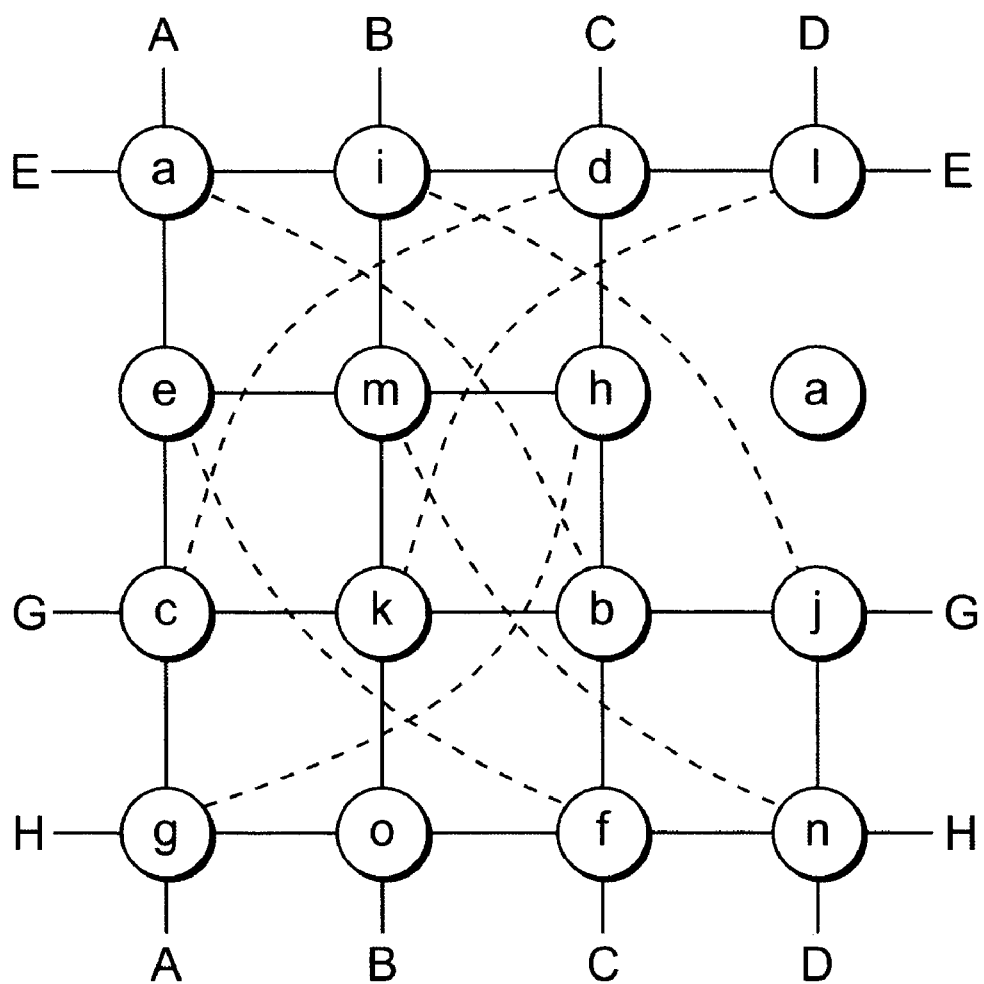

At FIG. 17A depicts a network with 14 nodes in accordance with methods and systems consistent with the present invention;

FIGS. 17B–17H depict partitionings of the network in FIG. 17A;

FIG. 18A depicts a network with 15 nodes in accordance with methods and systems consistent with the present invention;

FIGS. 18B–18H depict partitionings of the network in FIG. 18A;

FIG. 19A depicts a network with 16 nodes in accordance with methods and systems consistent with the present invention; and FIGS. 19B–19I depict partitionings of the network in FIG. 19A.

DETAILED DESCRIPTION

In accordance with methods and systems consistent with the present invention, an improved network partitioning system is provided for use in subdividing a family of network topologies ranging from two to sixteen nodes. Using this system, each network can be subdivided into two subnetworks, with each subnetwork having any number of nodes as long as the total number of nodes in both of the two subnetworks equals the number of nodes in the original network. Also, each subnetwork can be further partitioned into subnetworks having any number of nodes as long as the total number of nodes in the subnetworks equals the original number of nodes in the subnetwork. This partitioning is therefore recursive and can be performed until the subnetworks reach an atomic level (i.e., contain a single node).

Furthermore, the system automatically provides each subnetwork with a set of routings that avoids deadlock. The term "deadlock" refers to an undesirable system state that occurs when a cycle of multi-hop packets are each waiting on a busy node on the next hop. A "multi-hop" packet refers to a packet that is routed through at least one node before reaching its destination. A deadlock may occur, for example, in a network of three nodes (node 1; node 2, and node 3), where node 1 is waiting to send a multi-hop packet to node 2 (which is not the packet's destination), where node 2 is waiting to send a multi-hop packet to node 3 (which is not the packet's destination), and where node 3 is waiting to send a multi-hop packet to node 1 (which is not the packet's destination). Since each node is waiting on the other, a stalemate or deadlock occurs, and these nodes are rendered non-operational.

Overview

To partition a network, the system administrator, using an administrator's console on one of the nodes, inputs the number of nodes desired for each subnetwork. The system then sends an indication to each of the nodes, stalling the nodes. While a node is stalled, each node buffers the packets that it is sending and the packets that it is receiving which are destined for another node. Next, the system matches the network to a predefined basic topology. The system maintains at least one basic topology for each network in the family of networks. After matching the network to a basic topology, the system identifies predefined subnetwork topologies that contain the desired number of nodes. These subnetwork topologies indicate how the network should be partitioned to form the subnetworks. The system has prestored subnetwork topologies for each possible partitioning of each basic topology. For example, for the basic topology with five nodes, the system stores topologies for partitioning the network into subnetworks of 4 nodes and 1 node, and 3 nodes and 2 nodes. Additionally, the system stores deadlock-free routings for each subnetwork.

After determining how to partition the network, the system updates the routing tables in each node of each subnetwork to reflect the partitioning. Then, the network resumes routing using the new routing tables which effectuates the partitioning of the network by routing all traffic for a particular subnetwork through nodes in that subnetwork. These routing tables have been designed to avoid deadlock. As stated above, the subnetworks are unconstrained as to the number of nodes that they can contain and this partitioning can occur recursively.

Methods and systems consistent with the present invention operate in a family of network topologies which have been selected to facilitate network performance. These network topologies are discussed in further detail in copending U.S. patent application Ser. No. 09/923,963, entitled "Improved Network Topologies," which has previously been incorporated by reference. These network topologies use deadlock-free routings as described in copending U.S. patent application Ser. No. 09/323,696, entitled "Deadlock-Free Routing," which has previously been incorporated by reference, and can use dynamically generated, deadlock-free routings when an error occurs, as described in copending U.S. patent application Ser. No. 09/323,964, titled "Dynamic Generation of Deadlock-Free Routings," which has previously been incorporated by reference. In addition to being selected for network performance characteristics, these network topologies have also been selected to facilitate reconfiguration as is further described in copending U.S. patent application Ser. No. 09/323,962, entitled "Improved Network Reconfiguration," which has previously been incorporated by reference.

Implementation Details

Figure 1:
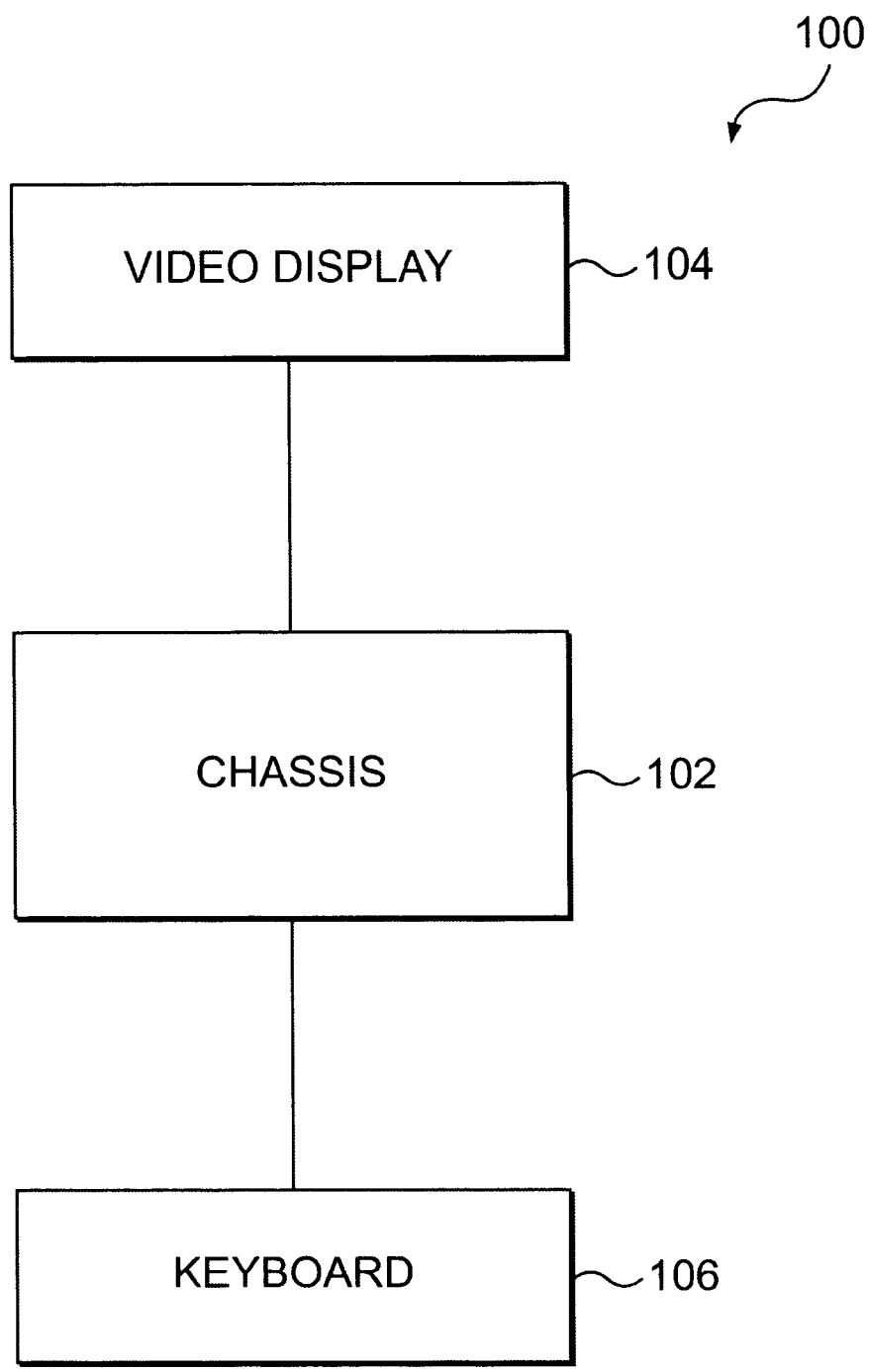
FIG. 1 depicts a data processing system suitable for use with methods and systems consistent with the present invention.

FIG. 1 depicts a data processing system 100 suitable for use with methods and systems consistent with the present invention. Data processing system 100 contains a chassis 102 connected to a video display 104 and a keyboard 106. Data processing system 100 is suitable for use as one or more nodes in the networks described below.

Figure 2:
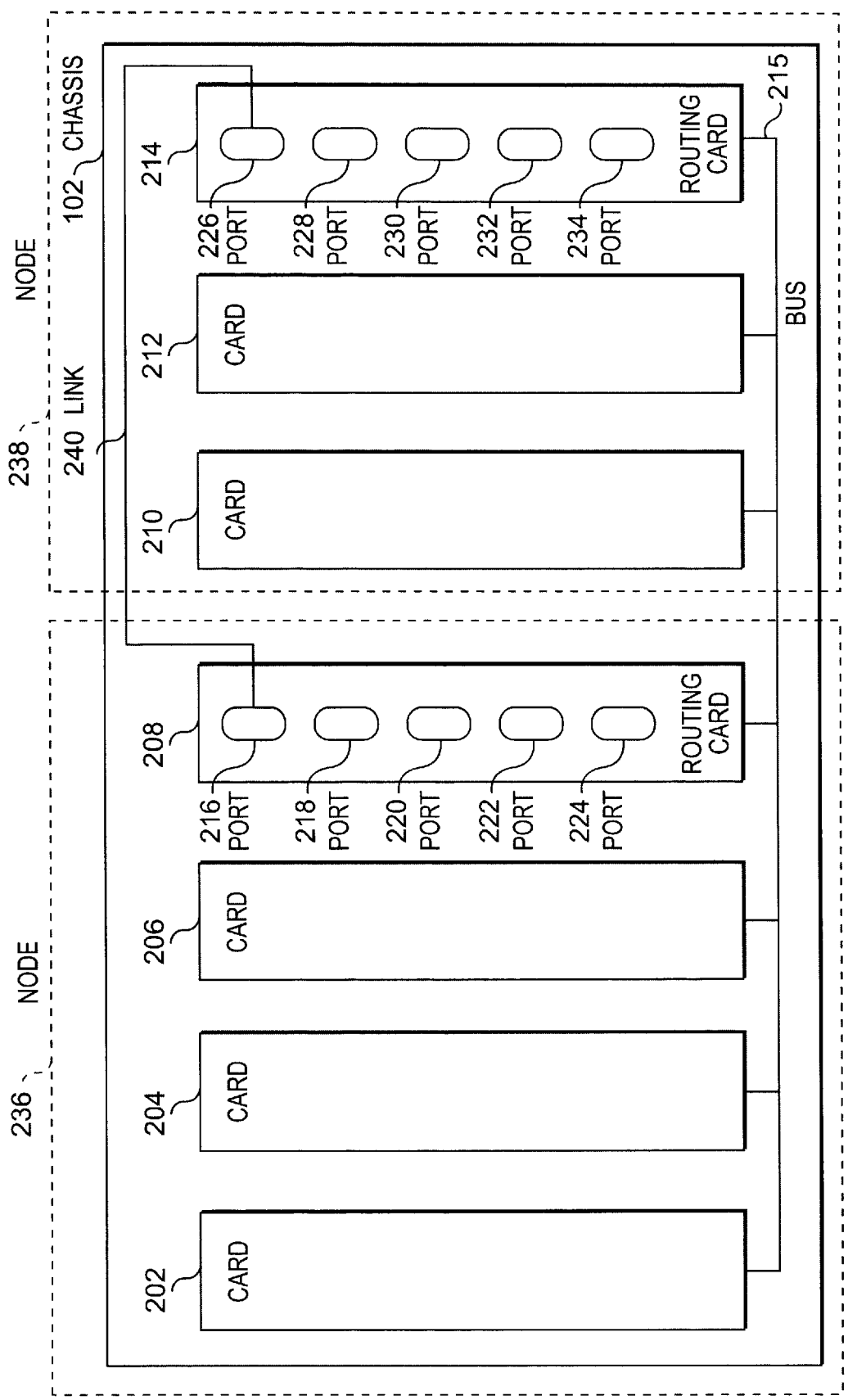
FIG. 2 depicts a more detailed diagram of the chassis of FIG. 1.

As shown in FIG. 2, chassis 102 contains up to seven cards 202–214 interconnected via bus 215. Of these cards, cards 208 and 214, known as routing cards, perform routing functionality with each having five ports 216–224 and 226–234 that connect to a communication link (e.g., a cable). The cards other than the routing cards (i.e., cards 202–206, 210, and 212) typically contain multiple CPUs, memory, and secondary storage. In accordance with methods and systems consistent with the present invention, cards 202–208 form a single node 236. Likewise, cards 210–214 form a single node 238. Nodes 236 and 238 are referred to as partner nodes because they are both located in the same chassis 102. Since node 236 and node 238 are separate communications nodes, they may be interconnected via a communications link 240, known as a partner link. A partner link is used to transfer control information between two partner nodes; the actual data is transferred via the bus 215 for faster communications. One skilled in the art will appreciate that data processing system 100 and chassis 102 may include additional or different components, including additional nodes.

Figure 3:
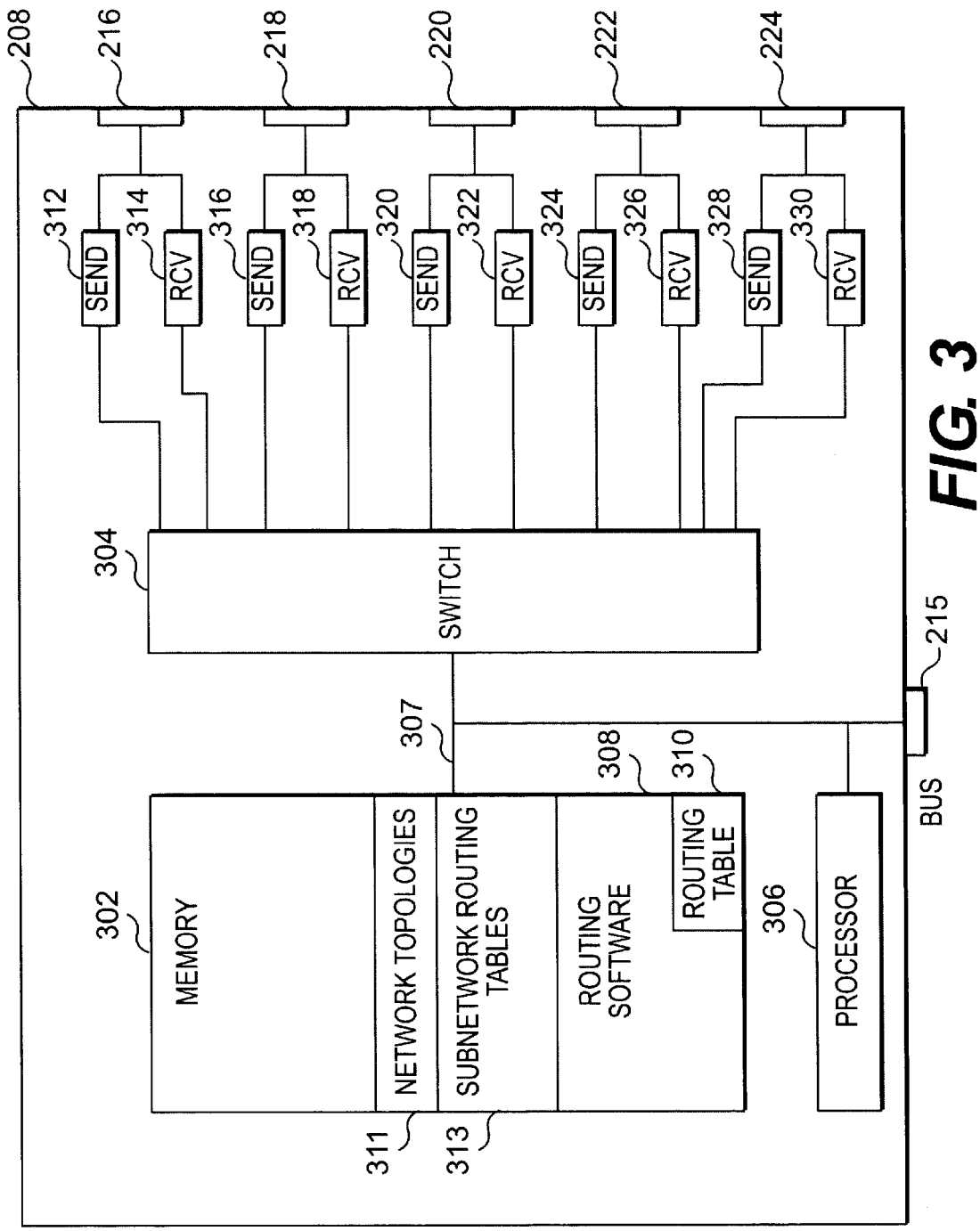
FIG. 3 depicts a more detailed diagram of the routing card depicted in FIG. 2.

FIG. 3 depicts a more detailed diagram of routing card 208, although routing card 214 is similarly configured. Routing card 208 contains a memory 302, a switch 304, an d a processor 306 interconnected by an internal bus 307, which also connects to bus 215. Memory 302 contains routing software 308 that routes traffic through the network using routing table 310 and that partitions the network into subnetworks. Routing table 310 may contain part or all of the information contained in the routing tables described below. Memory 302 also contains network topologies 311 and subnetwork routing tables 313. Network topologies 311 include a basic topology that matches each network in the family of networks ranging from 2 to 16 nodes, and for each basic topology, network topology 311 contains various subnetwork topologies reflecting all possible partitionings of the basic topology. Subnetwork routing tables 313 contain deadlock-free routing tables for each subnetwork topology in network topologies 311. Switch 304 coordinates the sending and receiving of information across the network via ports 216–224 by using a send and receive buffer 312–330 for each port.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Additionally, although the present invention is described relative to a network with nodes, one skilled in the art will appreciate that the present invention can also be used in multiprocessor systems where each node is a processor. Sun, Sun Microsystems, the Sun logo, Java™, and Java™ based trademarks are trademarks or registered trademarks of Sun Microsystems, Inc. in the United States and other countries.

Figure 4:
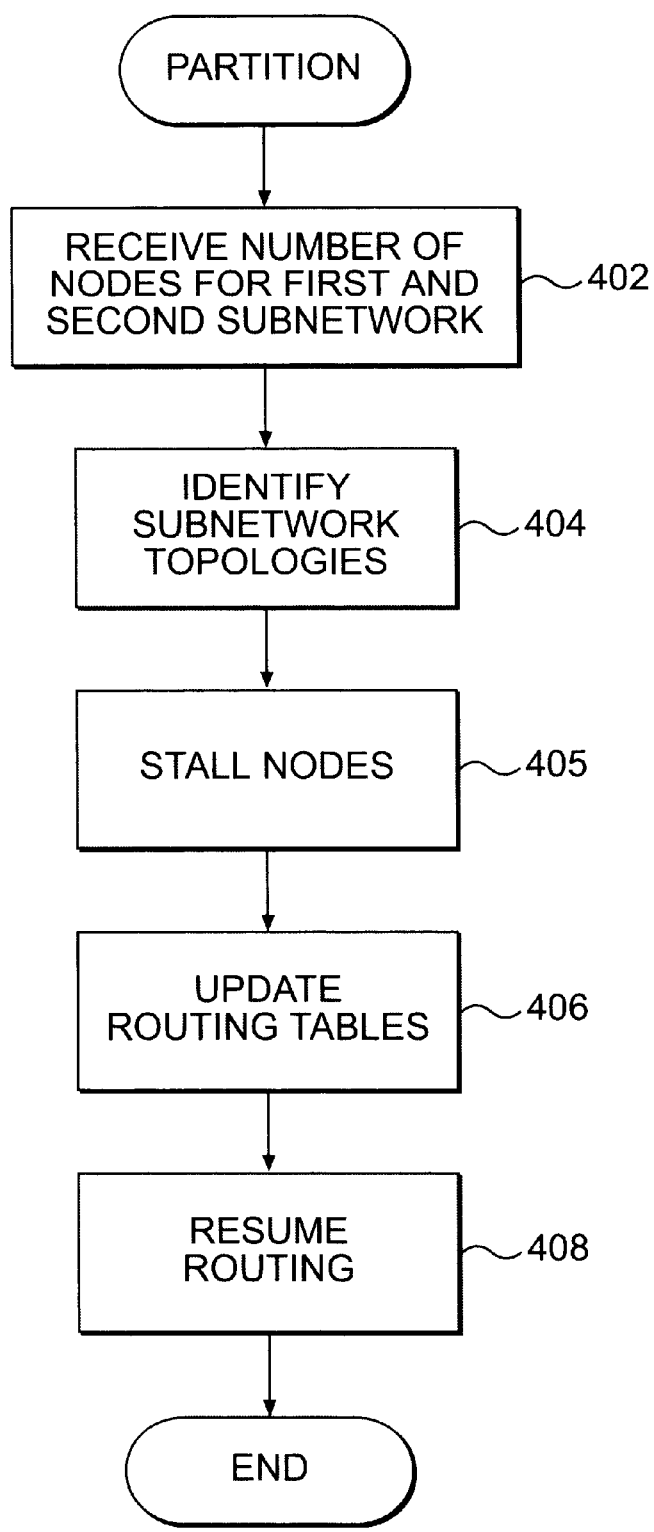
FIG. 4 depicts a flowchart of the steps performed by the routing software depicted in FIG. 3 when partitioning a network in accordance with methods and systems consistent with the present invention.

FIG. 4 depicts a flowchart of the steps performed by the routing software when partitioning a network. The first step performed by the routing software is to receive an indication of the number of nodes in the first subnetwork and the number of nodes in the second subnetwork from the network administrator (step 402). Each number is unconstrained in that it may be any number from 1 to N−1, where N is the total number of nodes in the network, as long as the total number of nodes in both the first subnetwork and second subnetwork equals N. For example, in a network of 13 nodes, the network administrator may indicate that the first subnetwork should have 6 nodes and the second subnetwork should have 7 nodes.

Next, the routing software matches the topology of the network to that of a prestored basic topology and identifies two subnetwork topologies for this basic topology that each contain the same number of nodes as those requested in step 402 (step 404). These subnetwork topologies identify the manner in which to partition the network: they identify which of the nodes in the network belong to each subnetwork and identify a new naming for each node. Each of these subnetwork topologies as well as the basic topologies are described in further detail below. After matching the topology, the routing software stalls the nodes (step 405). In this step, the routing software sends a signal to each node indicating that each node should deliver all outstanding packets already in transit but not generate any new traffic. After all outstanding packets have been delivered, the routing software updates each node with a new routing table that effectuates the partitioning by having the nodes of each subnetwork route traffic through nodes in that subnetwork (step 406). Each of these tables is further described below. After updating the routing tables, the routing software sends a signal to each node indicating that it should resume routing using the new routing tables (step 408). After this signal is sent, the network resumes operation except as two subnetworks.

Partitionable Network Topologies

Figure 5A:
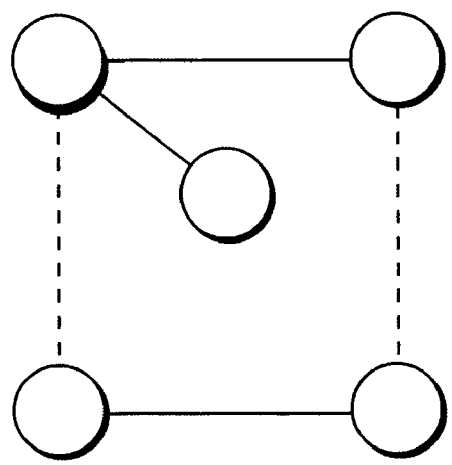
FIG. 5A depicts an exemplary network with 5 nodes.
Figure 5B:
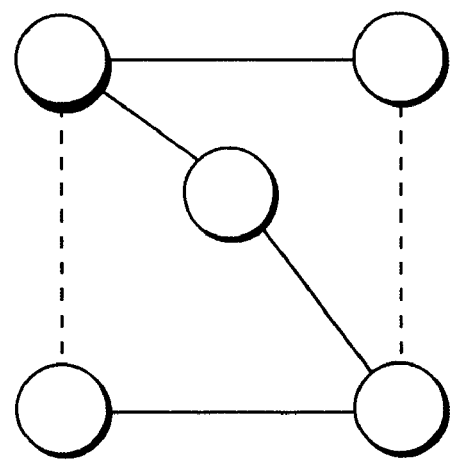
FIG. 5B depicts a network with 5 nodes that matches the topology of the network of FIG. 5A.

As stated above, the network topologies provided by methods and systems consistent with the present invention are unconstrained when being partitioned. That is, these networks, described below, can be partitioned into two subnetworks having any number of nodes as long as the total number of nodes for both subnetworks equals the original number of nodes in the network. Methods and systems consistent with the present invention provide a basic topology for networks having from 2 nodes to 16 nodes. Each of these basic topologies has a predefined set of subnetwork topologies for all possible partitionings. Thus, when partitioning one of the basic topologies, each subnetwork matches one of the predefined subnetwork topologies. That is, whenever a basic topology is partitioned, it splits in such a way that the two resulting networks match two of the predefined subnetwork topologies. This rule applies when subdividing a subnetwork as well. A subnetwork matches a subnetwork topology if it can be made identical to the subnetwork topology by deleting (i.e., simply ignoring) some number of links (possibly none). During this matching, partner links are matched to partner links and nonpartner links are matched to nonpartner links, thus ensuring that any partner relationship between nodes is respected and preserved to facilitate network performance. For example, the topology shown in FIG. 5A matches the subnetwork depicted in FIG. 5B. Partner links appear as dashed lines and non-partner links appear as solid lines.

Each predefined subnetwork topology has been selected because of various desirable properties. For example, every subnetwork topology represents a topology that has a deadlock-free routing and a diameter of at most three. The "diameter" of a network refers to the maximum number of links that must be traversed between any two nodes.

Below, the basic topologies and all possible partitionings of networks with three nodes to sixteen nodes are presented. The basic topology of size two is not presented because all that is required to partition this network is to ignore the link between the two nodes. For each basic topology, the various subnetwork topologies for each possible partitioning is presented as well as deadlock-free routings for each subnetwork topology.

Basic Topology for Networks With Three Nodes

Figure 6:
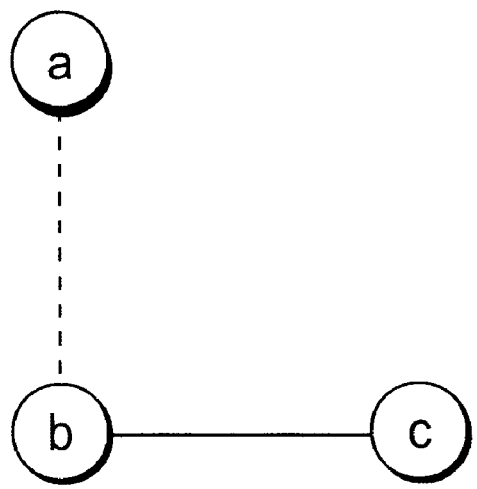
FIG. 6 depicts a network with 3 nodes in accordance with methods and systems consistent with the present invention.

The basic topology of a network with three nodes comprises two nodes that are partners as well as a third node connected to one of the other two, as depicted in FIG. 6. This basic topology can be split into a subnetwork of size two and another of size one by deleting the link from nodes B and C. The routings for the subnetwork of size 2 are provided below.

| FROM\TO | a | b |
|---|---|---|
| a |  | — |
| b | — |  |

The routings for the network of size 3 are provided below.

| FROM\TO | a | b | c |
|---|---|---|---|
| a |  | — | b |
| b |  | — | — |
| c |  | b | — |

Basic Topology for Networks with Four Nodes

Figure 7:
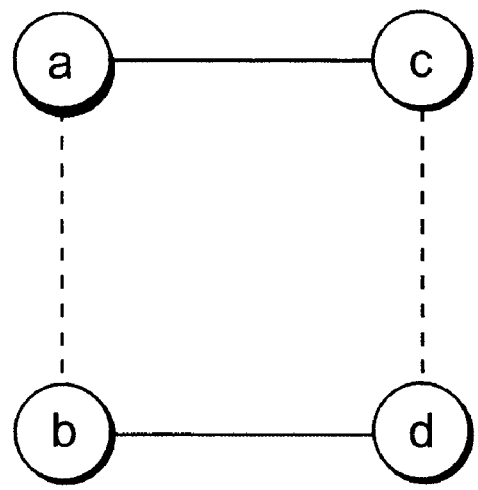
FIG. 7 depicts a network with 4 nodes in accordance with methods and systems consistent with the present invention.

The basic topology for networks with four nodes matches the topology depicted in FIG. 7. This topology can be split into two subnetwork topologies of size two by deleting the link from A to C and from node B to node D. This topology can also be split into a subnetwork of size three and a subnetwork of size one by deleting the links coming from any one of the nodes. The routings for the subnetwork of sizes 2 and 3 have already been described.

In the following description, various subnetwork topologies are provided with deadlock-free routings for each one. Two subnetworks having the same number of nodes use the same routings. For example, the routings for the network of three nodes, described above, are the same for all to subnetworks with three nodes regardless of the size of the original network. Thus, for purposes of economy, when a set of routings for a subnetwork of a particular size has been presented, it will not be duplicated. It should be understood that all subnetworks of that size use the same set of routings.

Basic Topology for Networks With Five Nodes

FIG. 8A depicts the basic topology of networks with five nodes. FIG. 8B depicts the basic topology divided into subnetworks of sizes three and two. Note that nodes "C" and "D" in FIG. 8A become nodes "A" and "B" in FIG. 8B, indicating that these nodes are part of a different subnetwork. This convention will be used in the following diagrams. FIG. 8C depicts the network divided into two subnetworks with four nodes and one node. The subnetwork with four nodes uses the following routings:

| FROM\TO | a | b | c | d |
|---|---|---|---|---|
| a |  | — | — | c |
| b |  | — |  | d | — |
| c |  | — | a | — | — |
| d |  | b | — | — |  |

Basic Topology for Networks With Six Nodes

Figure 9A:
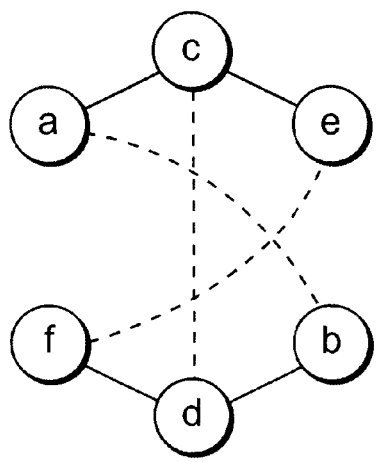
FIG. 9A depicts a network with 6 nodes in accordance with methods and systems consistent with the present invention.
Figure 9B:
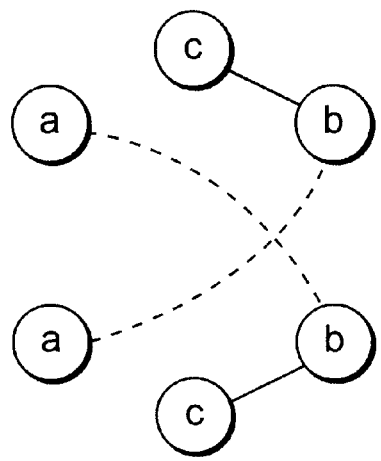
FIGS. 9B–9D depict partitionings of the network depicted in FIG. 9A.
Figure 9C:
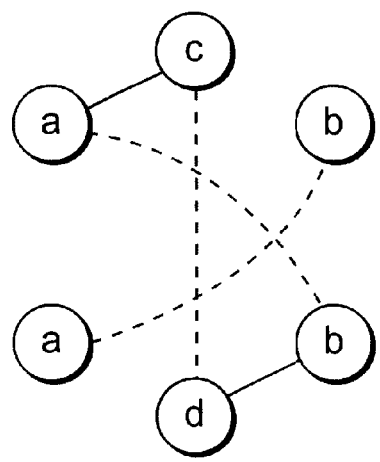
Figure 9D:
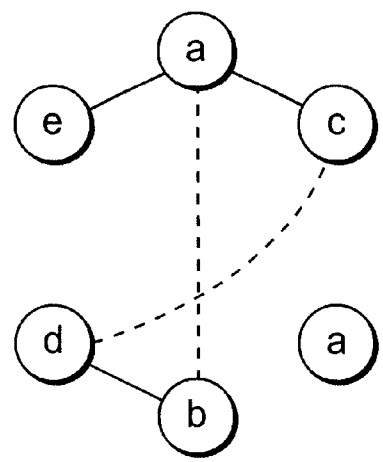

FIG. 9A depicts the basic topology for networks with six nodes. FIG. 9B depicts this topology divided into two subnetworks of sizes three and three, FIG. 9C depicts this topology divided into subnetworks of sizes four and two, and FIG. 9D depicts this topology divided into a subnetwork of sizes five and one. The subnetwork with five nodes uses the following routings:

| FROM\TO | a | b | c | d | e |
|---|---|---|---|---|---|
| a |  | — | — | c | — |
| b | — |  | d | — | a |
| c | — | a |  | — | a |
| d | b | — | — |  | b, a |
| e | — | a | a | a, c |  |

Figure 10A:
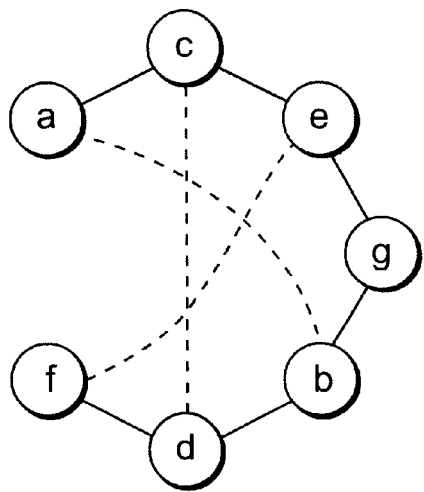
FIG. 10A depicts a network with 7 nodes in accordance with methods and systems consistent with the present invention.
Figure 10B:
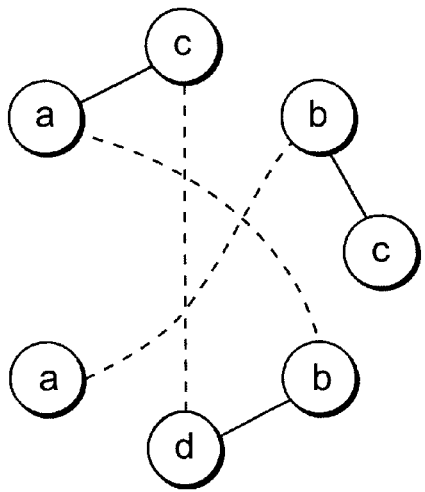
FIGS. 10B–10D depict partitionings of the network in FIG. 10A.
Figure 10C:
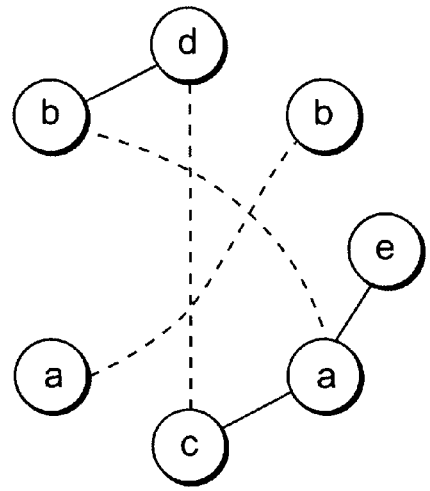
Figure 10D:
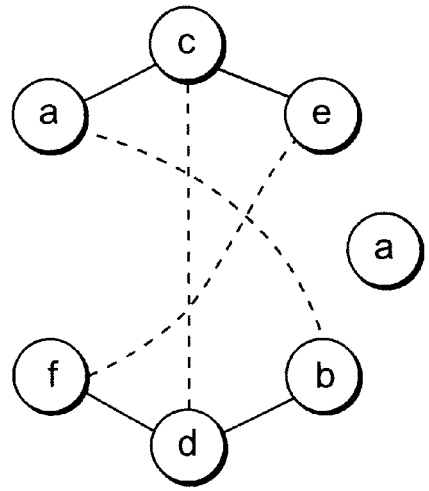

Basic Topology for Networks With Seven Nodes,

FIG. 10A depicts the basic topology for networks with seven nodes. FIGS. 10B–D depict this topology divided into subnetworks of four nodes and three nodes, five nodes and two nodes, and six nodes and one node, respectively. The subnetwork with six nodes uses the following routings:

| FROM\TO | a | b | c | d | e | f |
|---|---|---|---|---|---|---|
| a |  | — | — | c | c | c, e |
| b | — |  | d | — | d, f | d |
| c | — | a |  | — | — | e |
| d | b | — | — |  | f | — |
| e | c | c, a | — | c |  | — |
| f | d, b | d | d | — | — |  |

Basic Topology for Networks With Eight Nodes

Figure 11A:
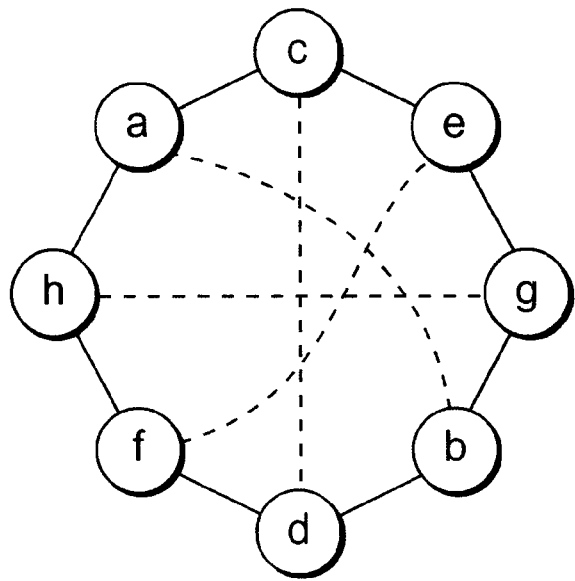
FIG. 11A depicts a network with 8 nodes in accordance with methods and systems consistent with the present invention.
Figure 11B:
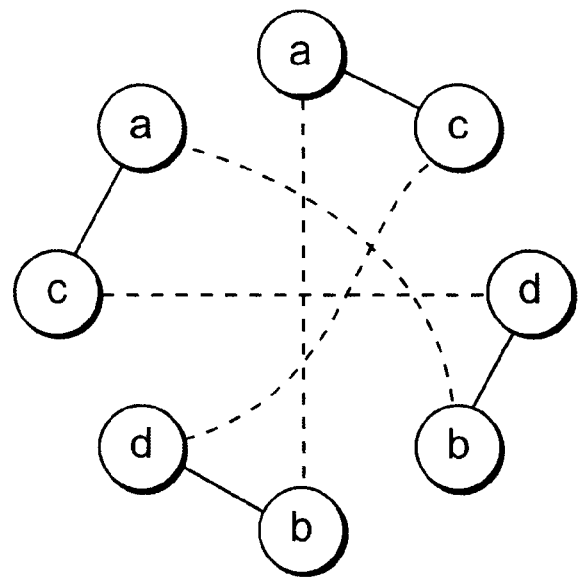
FIGS. 11B–11E depict partitionings of the network in FIG. 11A.
Figure 11C:
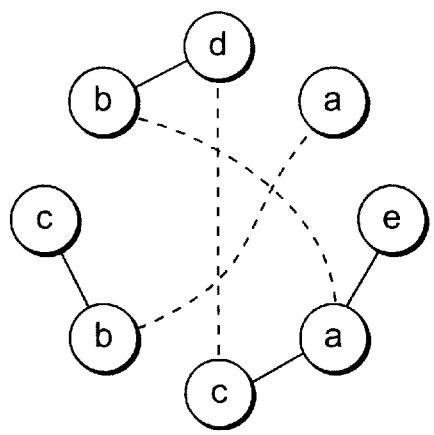
Figure 11D:
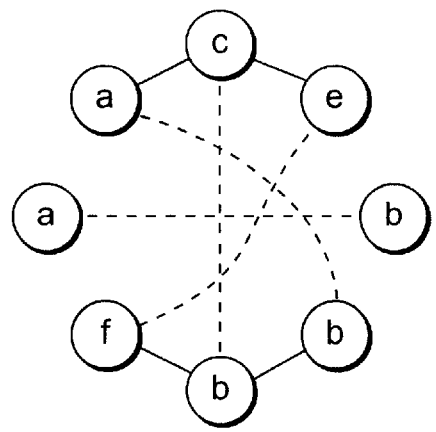
Figure 11E:
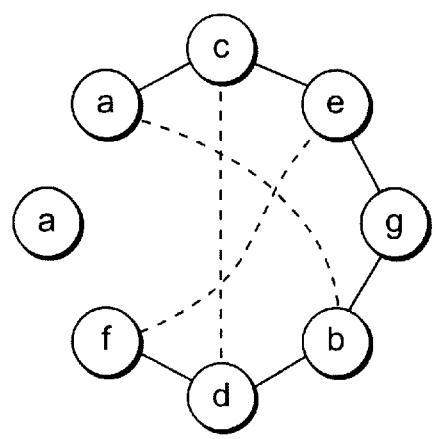

FIG. 11A depicts the basic topology for networks with eight nodes. FIGS. 11B–F depict this topology divided into subnetworks of four nodes and four nodes, five nodes and three nodes, six nodes and two nodes, and seven nodes and one node, respectively. The subnetwork with seven nodes uses the following routings:

| FROM\TO | a | b | c | d | e | f | g |
|---|---|---|---|---|---|---|---|
| a |  | — | — | c | c | c, e | c, e |
| b | — |  | d | — | g | d | — |
| c | — | a |  | — | — | e | e |
| d | b | — | — |  | f | — | b |
| e | c | g | — | c |  | — | — |
| f | d, b | d | d | — | — |  | d, b |
| g | b | — | e | b | — | e |  |

Basic Topology for Networks With Nine Nodes

Figure 12A:
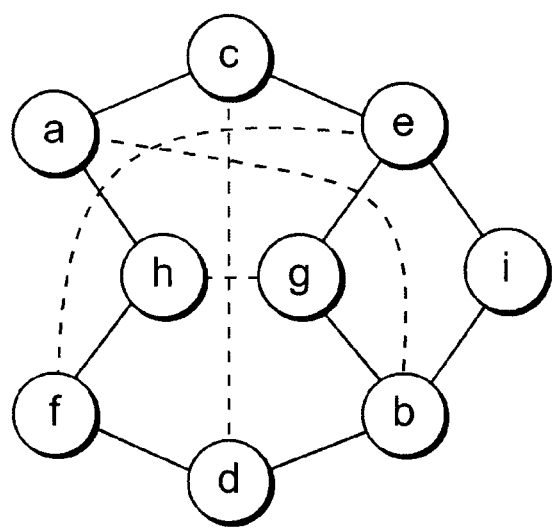
FIG. 12A depicts a network with 9 nodes in accordance with methods and systems consistent with the present invention.
Figure 12B:
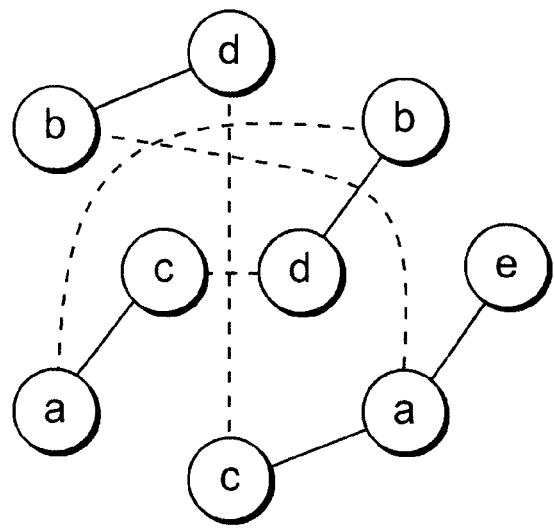
FIGS. 12B–12E depict partitionings of the network in FIG. 12A.
Figure 12C:
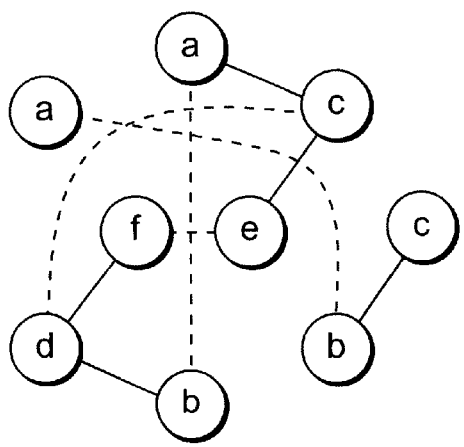
Figure 12D:
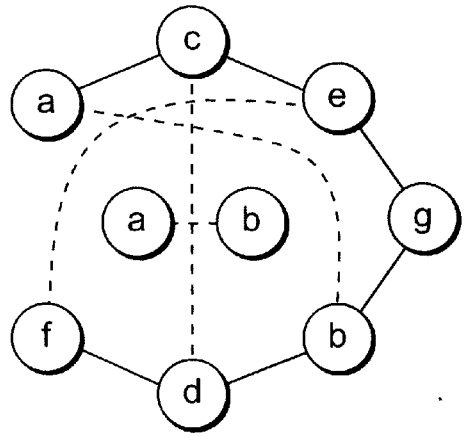
Figure 12E:
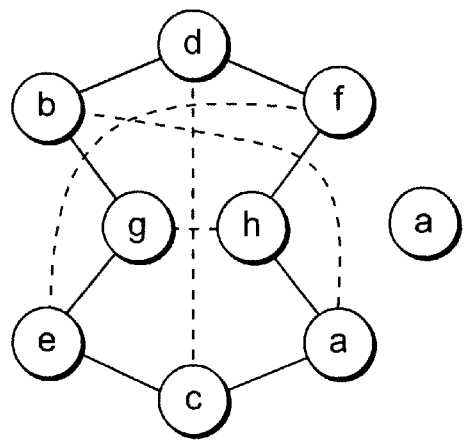

FIG. 12A depicts the basic topology for nine nodes. FIGS. 12B–E depict this topology subdivided into subnetworks of five nodes and four nodes, six nodes and three nodes, seven nodes and two nodes, and eight nodes and one node, respectively. The subnetwork with eight nodes uses the following routings:

| FROM\TO | a | b | c | d | e | f | g | h |
|---|---|---|---|---|---|---|---|---|
| a |  | — | — | c | c | h | h | — |
| b | — |  | d | — | g | d | — | g |
| c | — | a |  | — | — | e | e | e, g |
| d | b | — | — |  | f | — | b | f |
| e | c | g | — | c |  | — | — | g |
| f | h | d | d | — | — |  | h | — |
| g | b | — | e | b | — | e |  | — |
| h | — | a | f, d | f | f | — | — |  |

Basic Topology for Networks With Ten Nodes

Figure 13A:
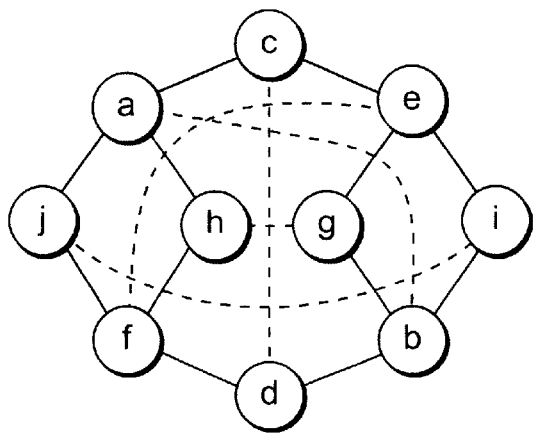
FIG. 13A depicts a network with 10 nodes in accordance with methods and systems consistent with the present invention.
Figure 13B:
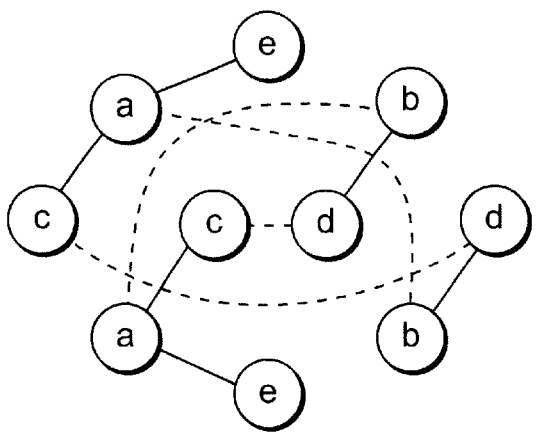
FIGS. 13B–13F depict partitionings of the network in FIG. 13A.
Figure 13C:
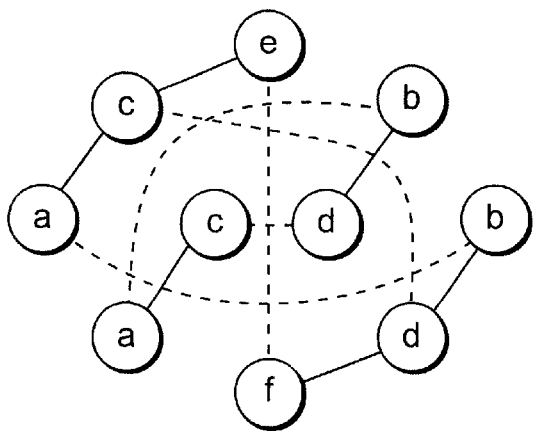
Figure 13D:
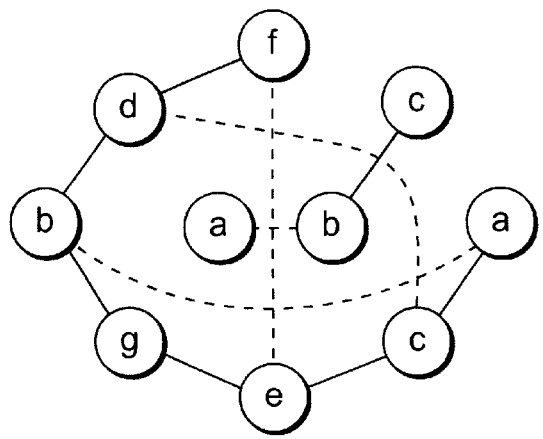
Figure 13E:
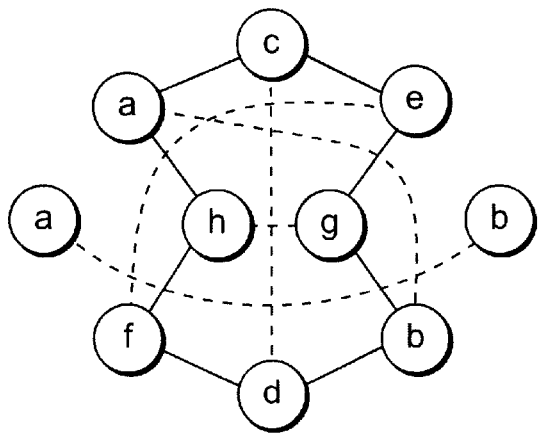
Figure 13F:
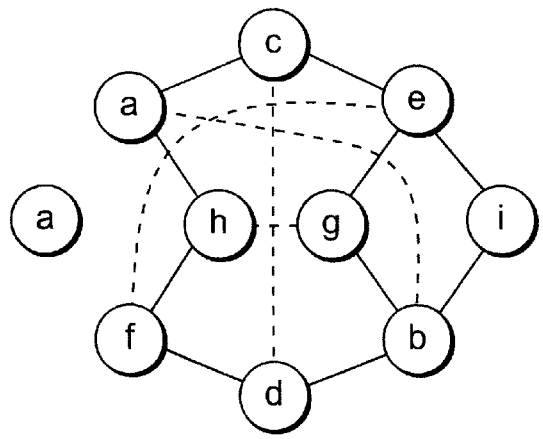

FIG. 13A depicts the basic topology for a network having ten nodes. FIGS. 13B–F depict this topology divided into subnetworks of five nodes and five nodes, six nodes and four nodes, seven nodes and three nodes, eight nodes and two nodes, and nine nodes and one node, respectively. The subnetwork with nine nodes uses the following routings:

| FROM\TO | a | b | c | d | e | f | g | h | i |
|---|---|---|---|---|---|---|---|---|---|
| a |  | — | — | c | c | h | h | — | b |
| b | — |  | d | — | d, f | d | — | g | — |
| c | — | a |  | — | — | e | e | a | e |
| d | b | — | — |  | f | — | b | f | b |
| e | c | c, a | — | c |  | — | — | g | — |
| f | h | d | d | — | — |  | h | — | e |
| g | b | — | e | b | — | e |  | — | e |
| h | — | a | a | f | f | — | — |  | f, e |
| i | b | — | e | b | — | e | b | b, g |  |

Basic Topologies for Networks With Eleven Nodes

Figure 14A:
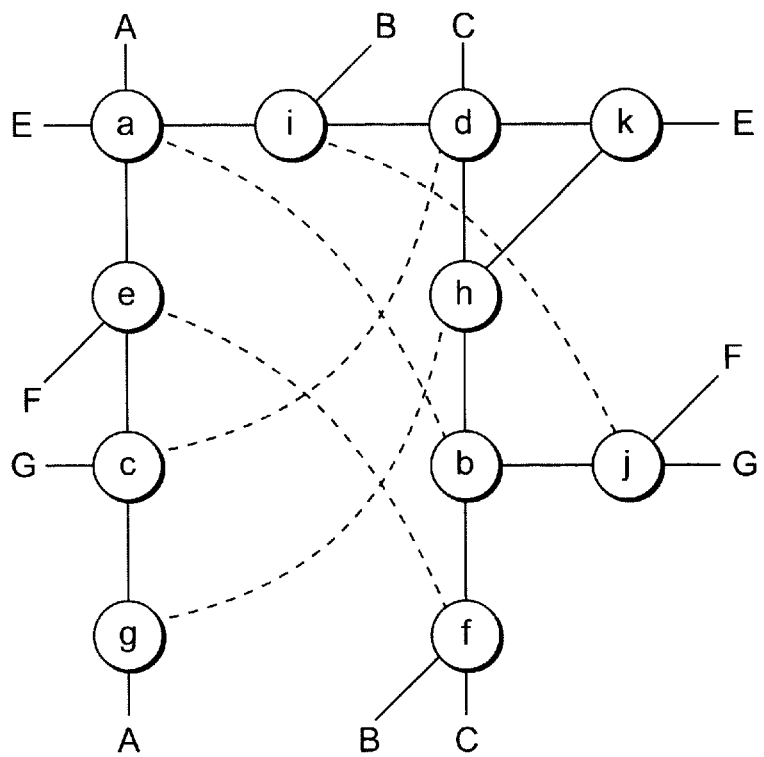
FIG. 14A depicts a network with 11 nodes in accordance with methods and systems consistent with the present invention.
Figure 14B:
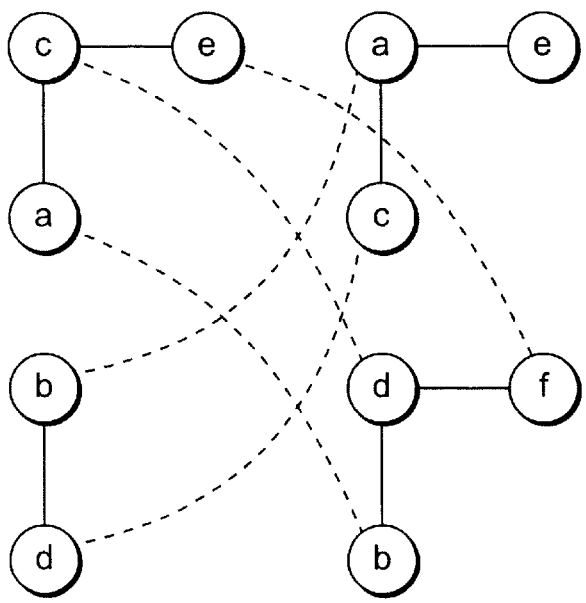
FIGS. 14B–14F depict partitionings of the network in FIG. 14A.
Figure 14C:
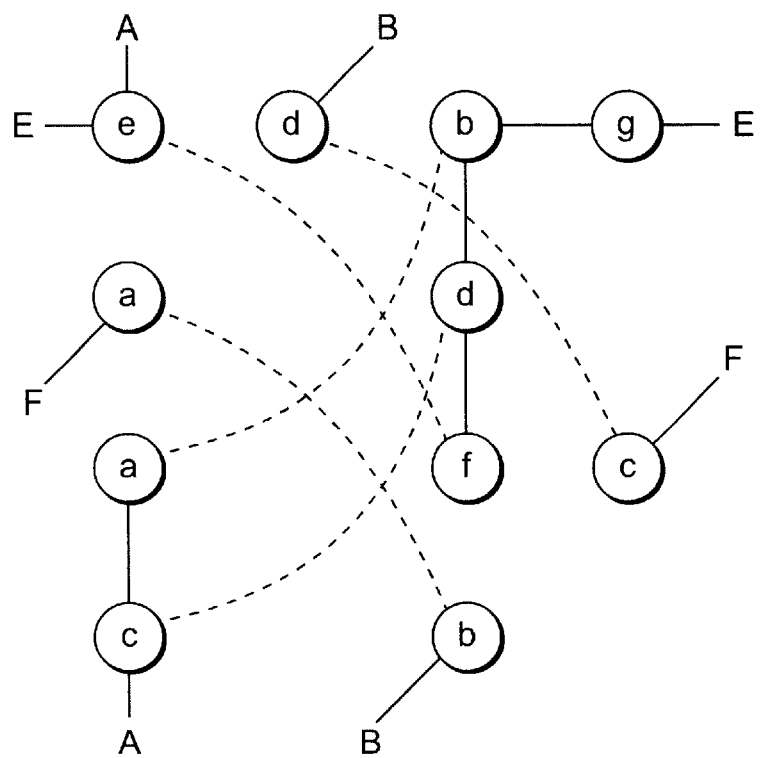
Figure 14D:
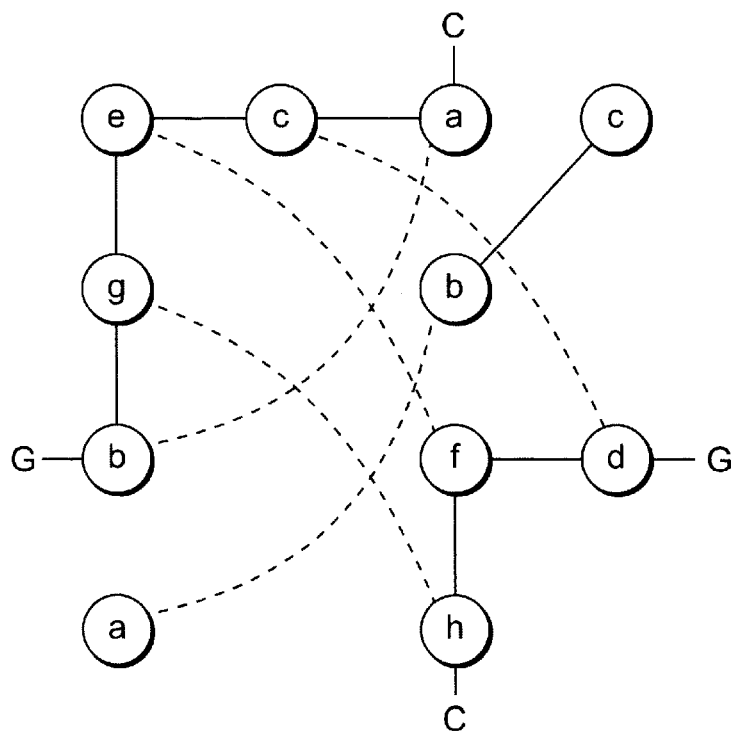
Figure 14E:
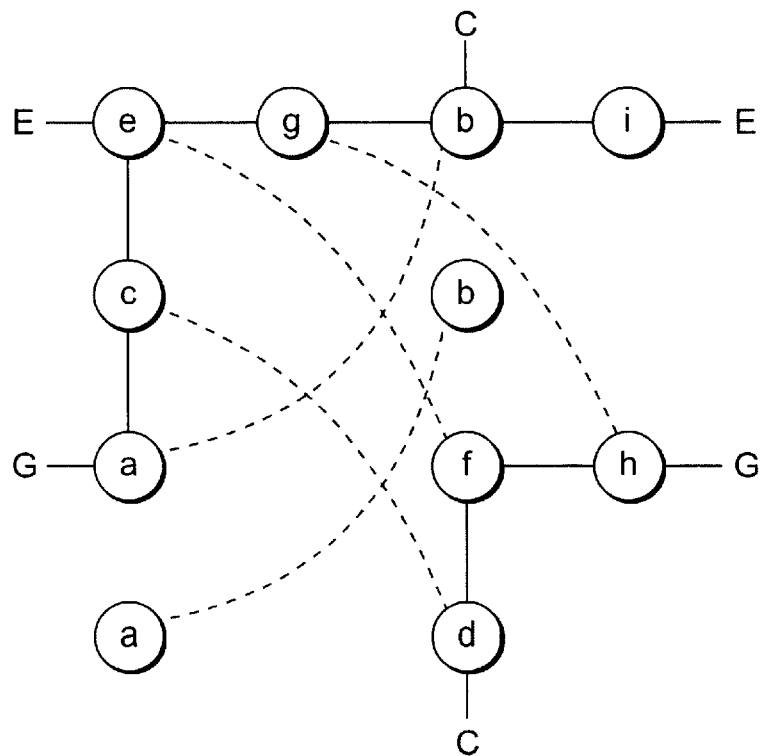
Figure 14F:
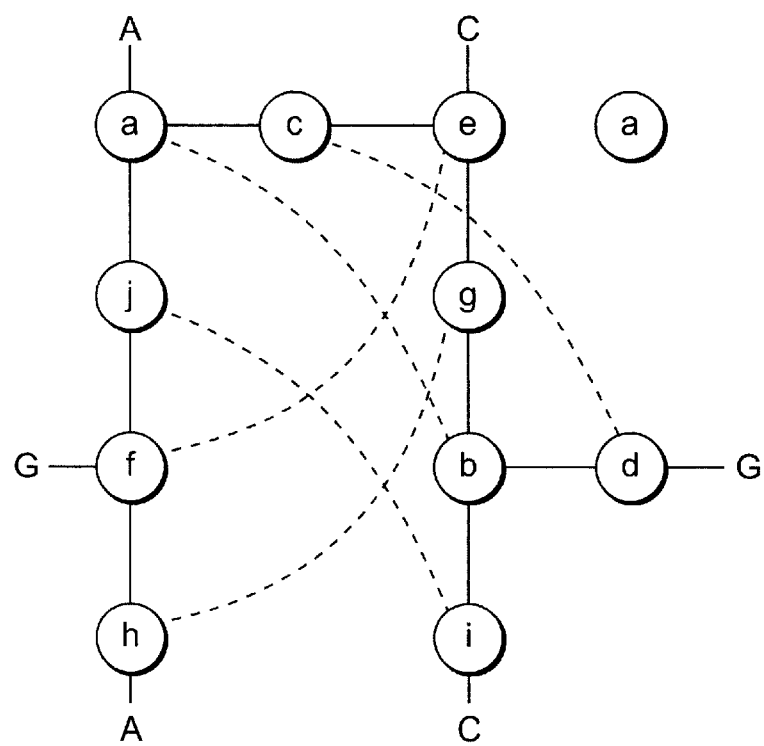

There are two basic topologies for networks with eleven nodes, the first of which is depicted in FIG. 14A. In this figure, the capital letters (e.g., "A") indicate a continuing connection to another like-lettered link. FIGS. 14B–14F depict this network subdivided into subnetworks of six nodes and five nodes, seven nodes and four nodes, eight nodes and three nodes, nine nodes and two nodes, and ten nodes and one node, respectively. The subnetwork with ten nodes uses the following routings:

| FROM\TO | a | b | c | d | e | f | g | h | i | j |
|---|---|---|---|---|---|---|---|---|---|---|
| a |  | — | — | c | c | j | h | — | j | — |
| b | — |  | d | — | i | d | — | g | — | i |
| c | — | a |  | — | — | e | a, h | a | e | e, i |
| d | b | — | — |  | f | — | b | b, g | f, j | f |
| e | c | g | — | c |  | — | — | g | — | i |
| f | h | d | d | — | — |  | h | — | j | — |
| g | b | — | e | e, c | — | e |  | — | e | e, i |
| h | — | a | f, d | f | f | — | — |  | f, j | f |
| i | b | — | b, d | b | — | e | b | b, g |  | — |
| j | — | a | a | a, c | f | — | a, h | a | — |  |

Figure 14G:
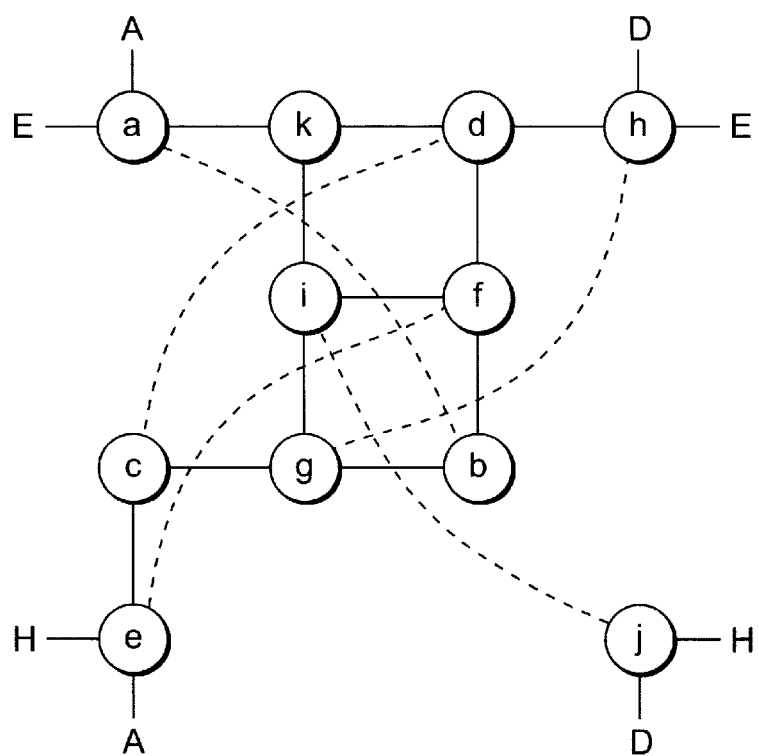
FIG. 14G depicts an alternative network with 11 nodes in accordance with methods and systems consistent with the present invention.
Figure 14H:
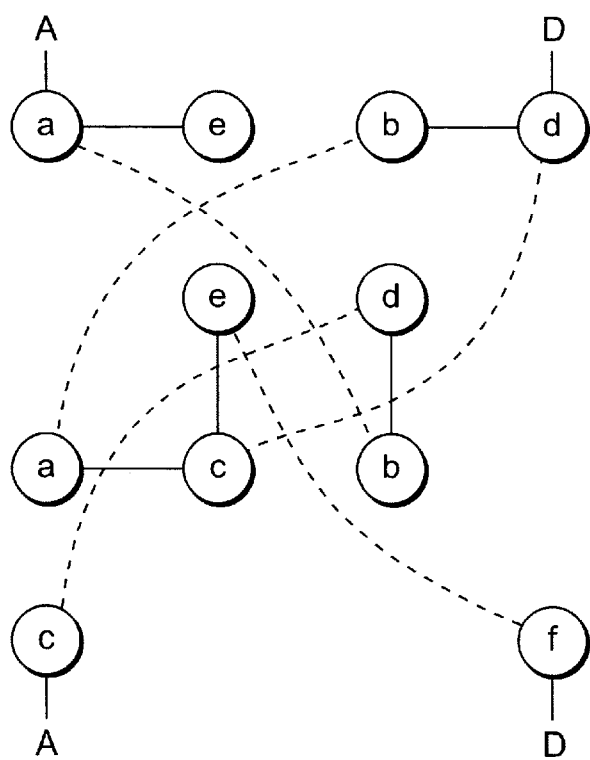
FIGS. 14H–14L depict partitionings of the network in FIG. 14G.
Figure 14I:
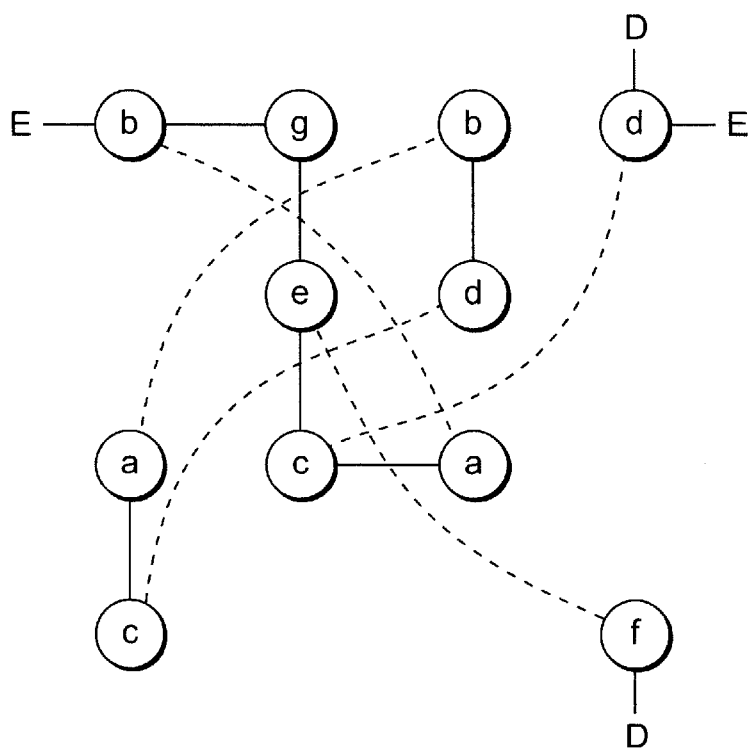
Figure 14J:
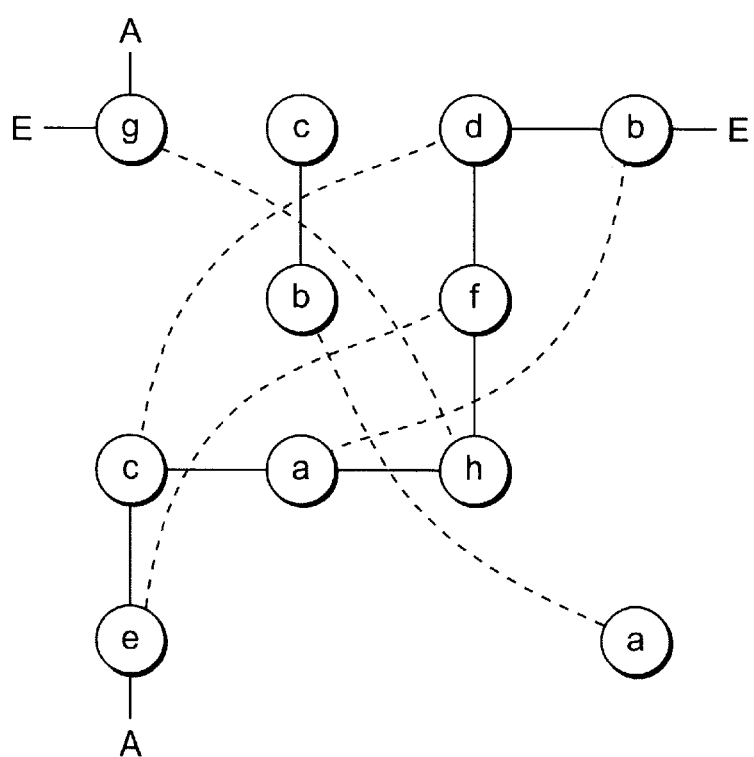
Figure 14K:
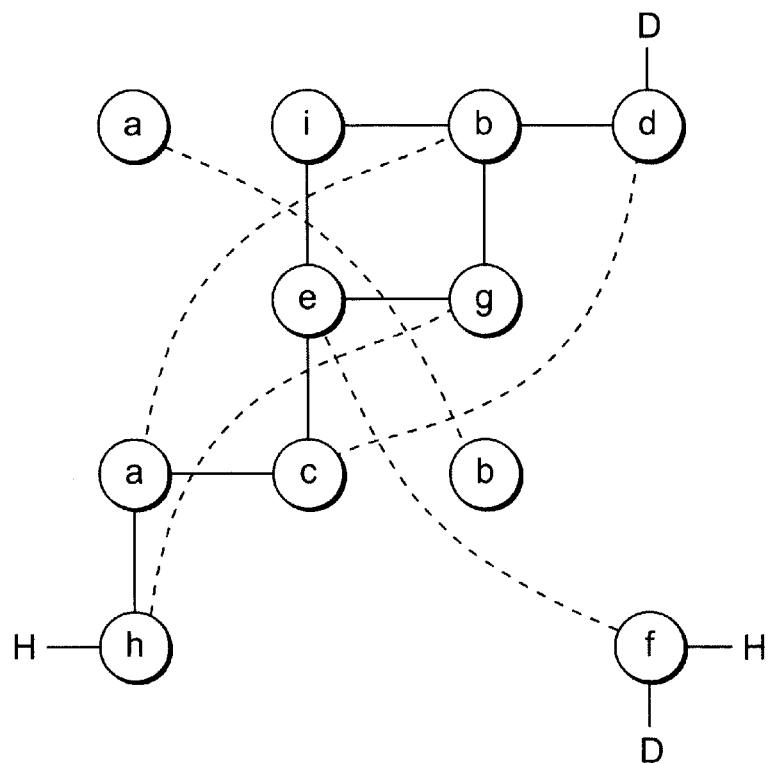
Figure 14L:
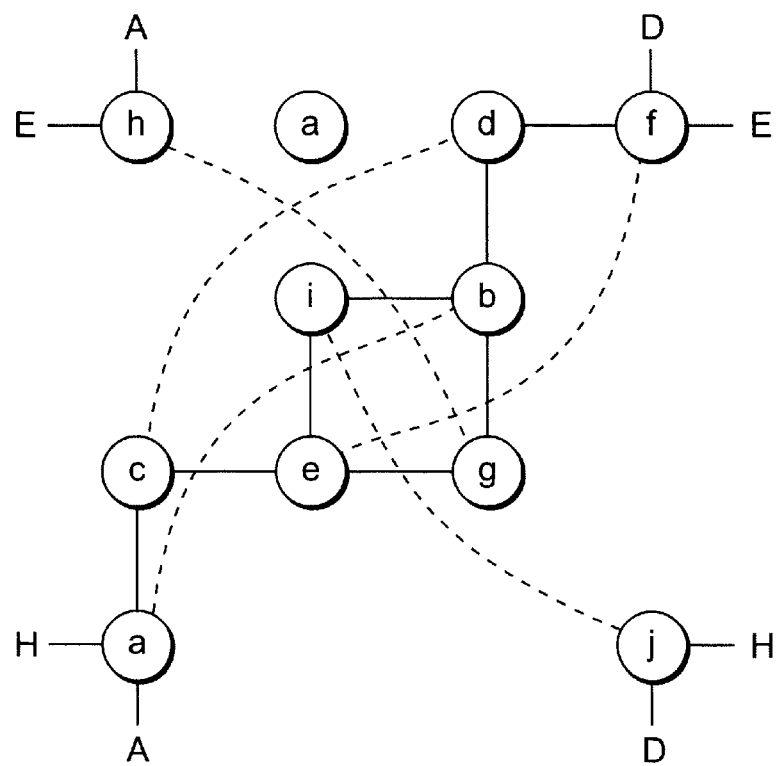

The second basic topology for networks with eleven nodes is depicted in FIG. 14G. FIGS. 14H–14L depict this topology partitioned into subnetworks of six nodes and five nodes, seven nodes and four nodes, eight nodes and three nodes, nine nodes and two nodes, and ten nodes and one node, respectively.

Basic Topologies for Networks With Twelve Nodes

Figure 15A:
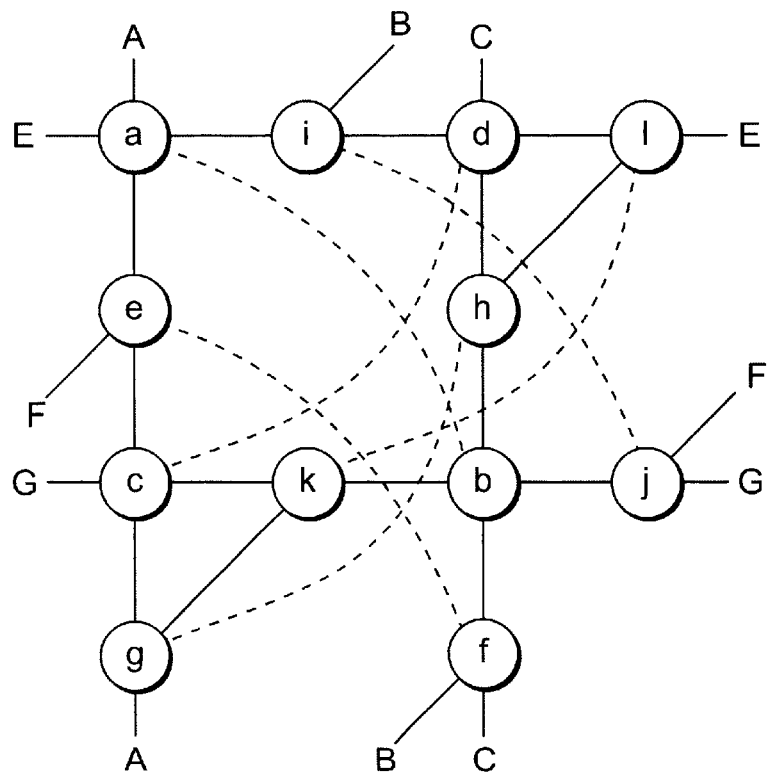
FIG. 15A depicts a network with 12 nodes in accordance with methods and systems consistent with the present invention.
Figure 15B:
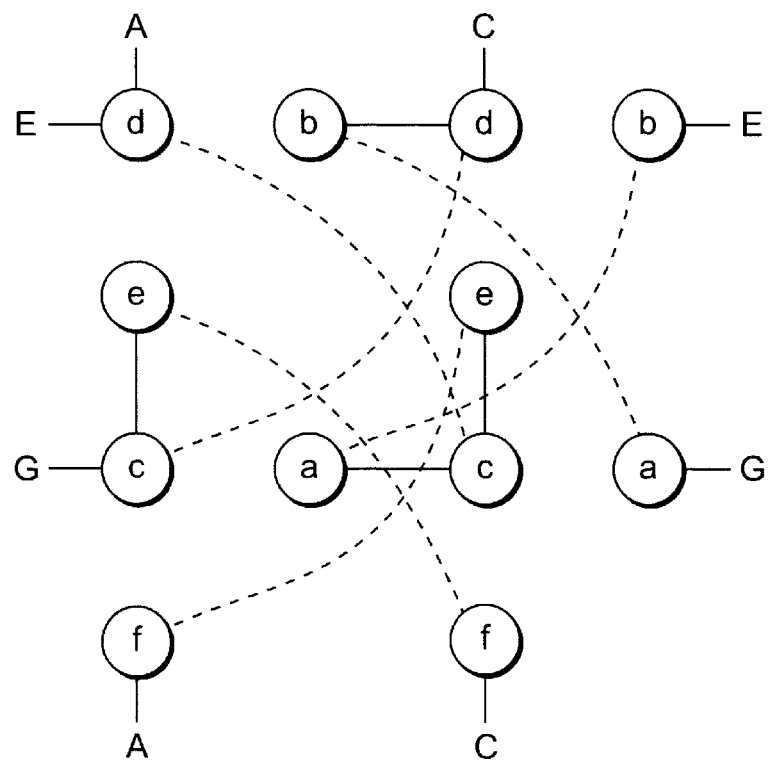
FIGS. 15B–15G depict partitionings of the network in FIG. 15A.
Figure 15C:
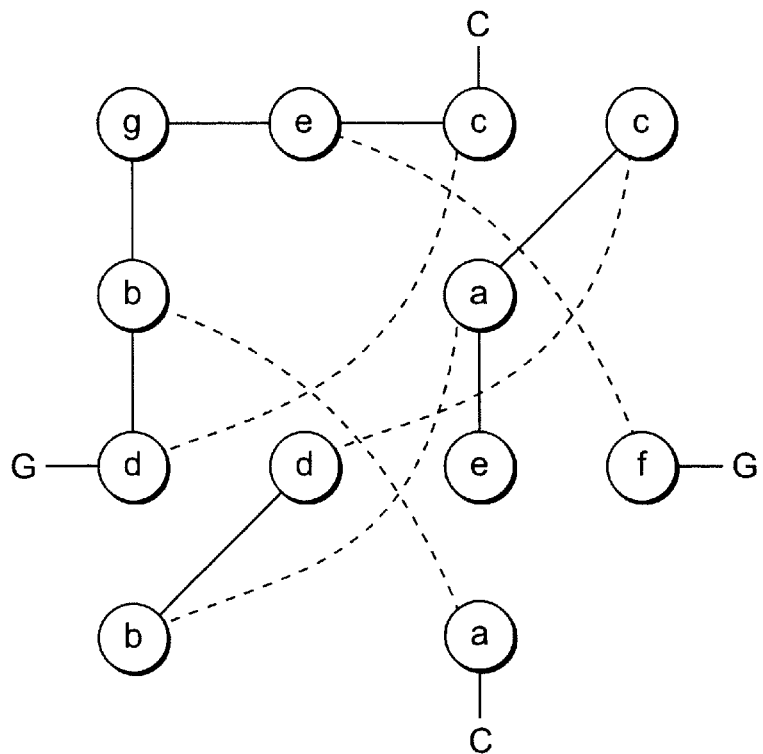
Figure 15D:
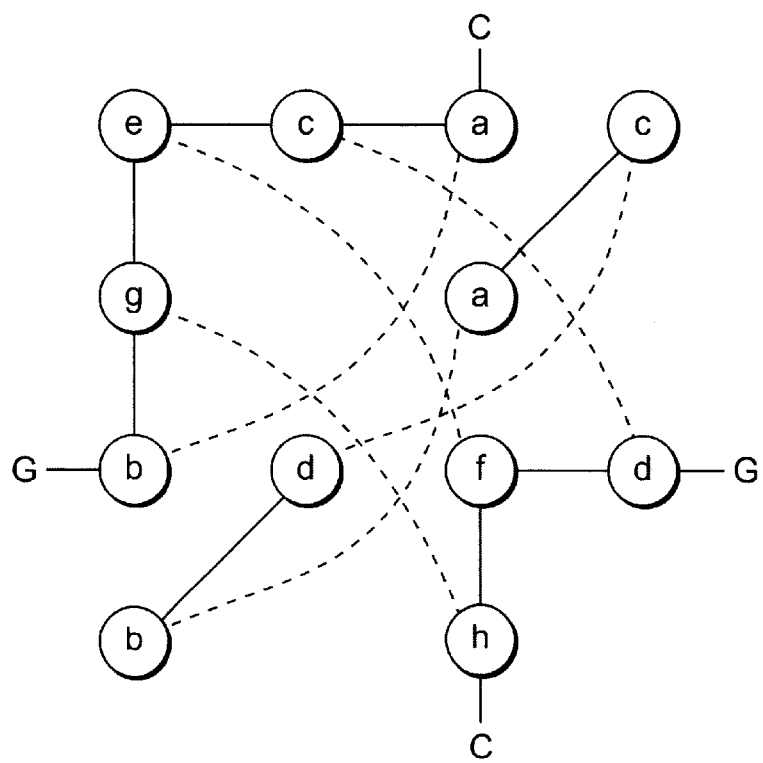
Figure 15E:
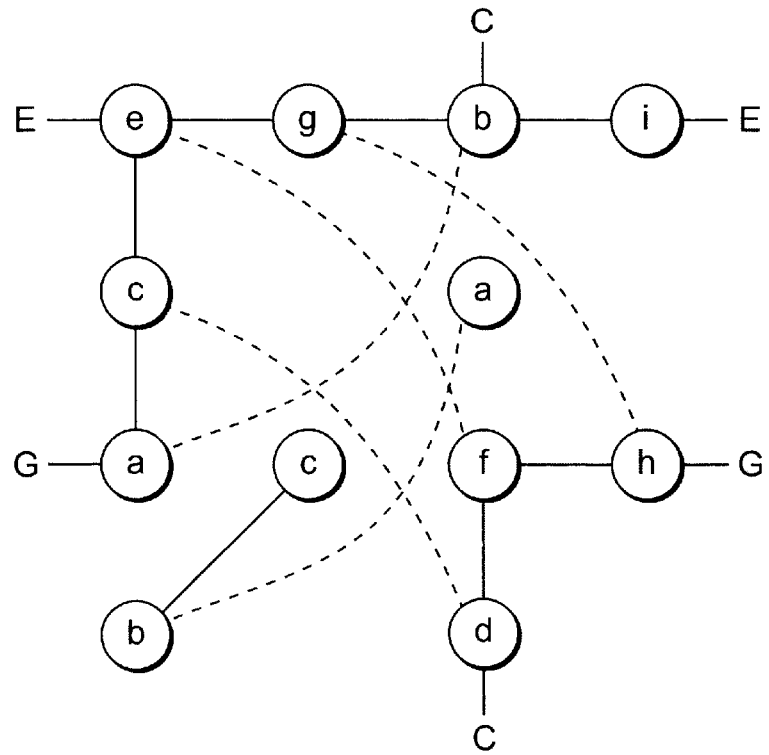
Figure 15F:
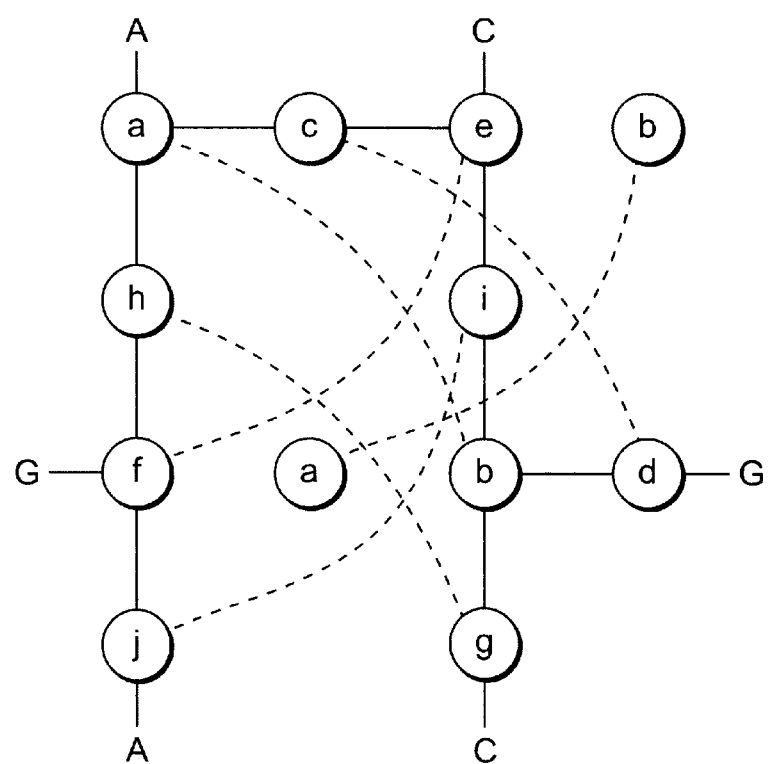
Figure 15G:
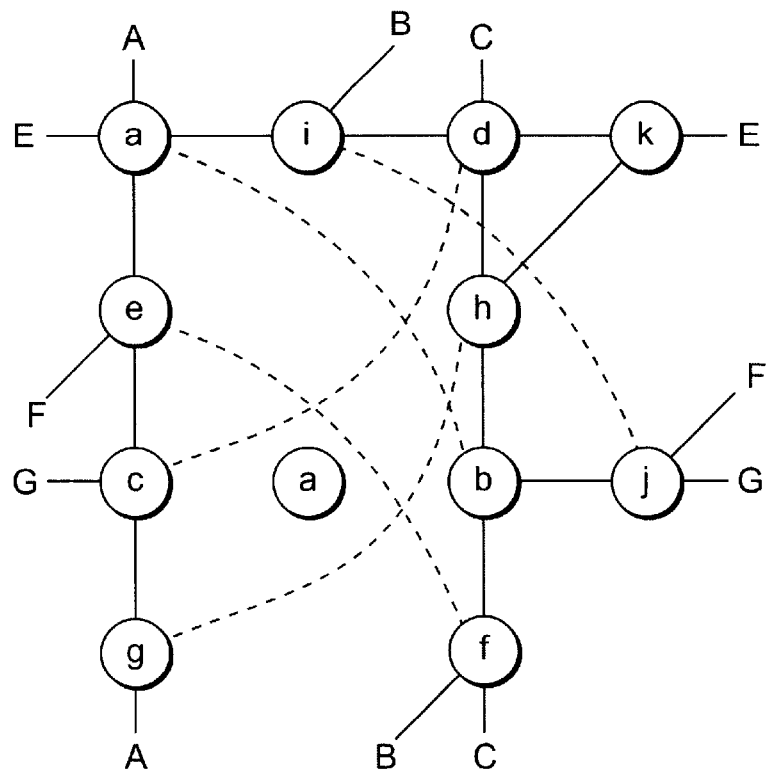

There are two basic topologies for networks with twelve nodes. The first topology is depicted in FIG. 15A. FIGS. 15B–15G depict this topology divided into subnetworks of six nodes and six nodes, seven nodes and five nodes, eight nodes and four nodes, nine nodes and three nodes, ten nodes and two nodes, and eleven nodes and one node, respectively. The subnetwork with eleven nodes uses the topology for eleven nodes depicted in FIG. 14A and uses the following routings:

| FROM\TO | a | b | c | d | e | f | g | h | i | j | k |
|---|---|---|---|---|---|---|---|---|---|---|---|
| a |  | — | g | i | — | e | — | g | — | i | — |
| b | — |  | j | h | f | — | h | — | j | — | h |
| c | e | j |  | — | — | e | — | g | j | — | d |
| d | i | f | — |  | — | f | — | h | — | — | i | — |
| e | — | a | — | c |  | — | — | c | c, g | j | — | c, d |
| f | b | — | d | — | — |  | — | d, h | d | — | i | d |
| g | — | a | — | c | a | a, e |  | — | a | a, i | c, d |
| h | k | — | d | — | b, f | b | — |  | b, j | b | — |
| i | — | a | d | — | f | — | d, h | d |  | — | d |
| j | b | — | — | c | — | e | c | c, g | — |  | c, d |
| k | — | d, f | d | — | d, f | d | h | — | d | d, i |  |

Figure 15H:
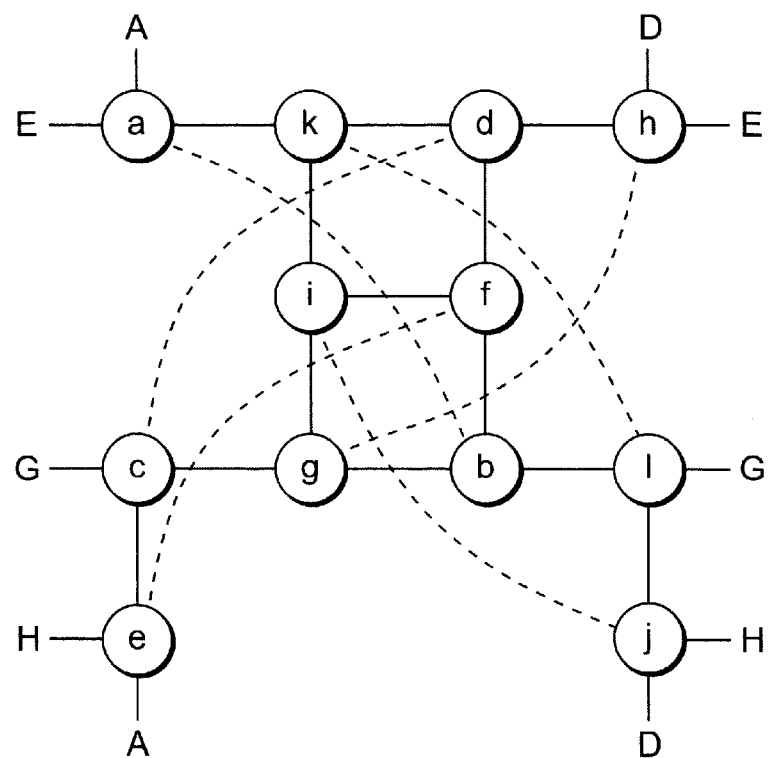
FIG. 15H depicts an alternative configuration of the network with 12 nodes in accordance with methods and systems consistent with the present invention.
Figure 15I:
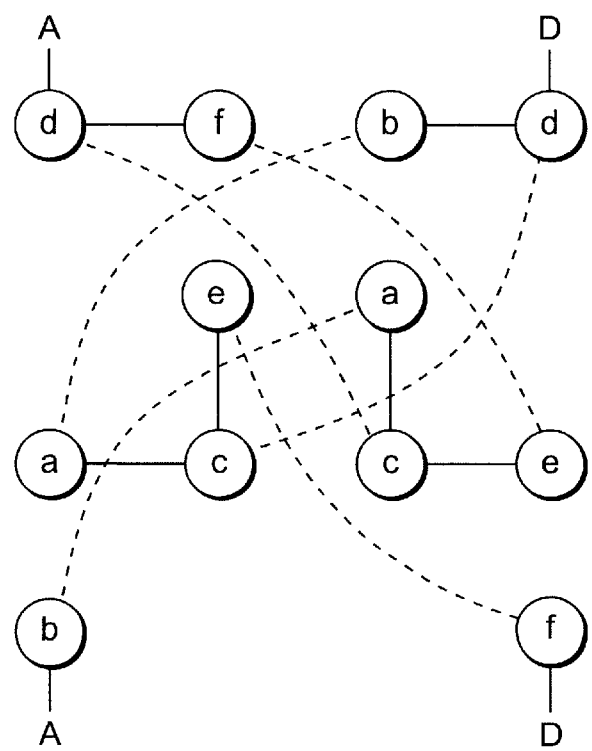
FIGS. 15I–15N depict partitionings of the networking FIG. 15H.
Figure 15J:
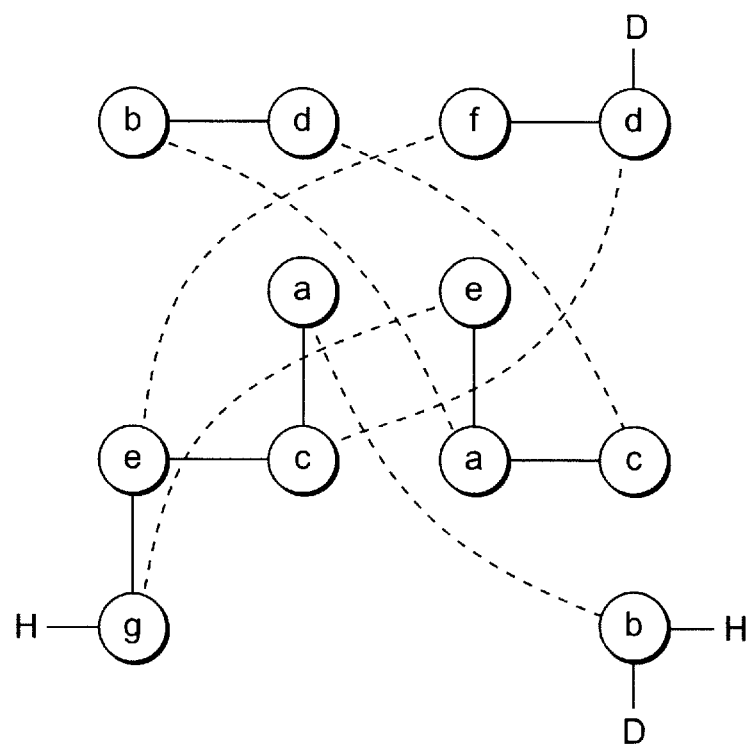
Figure 15K:
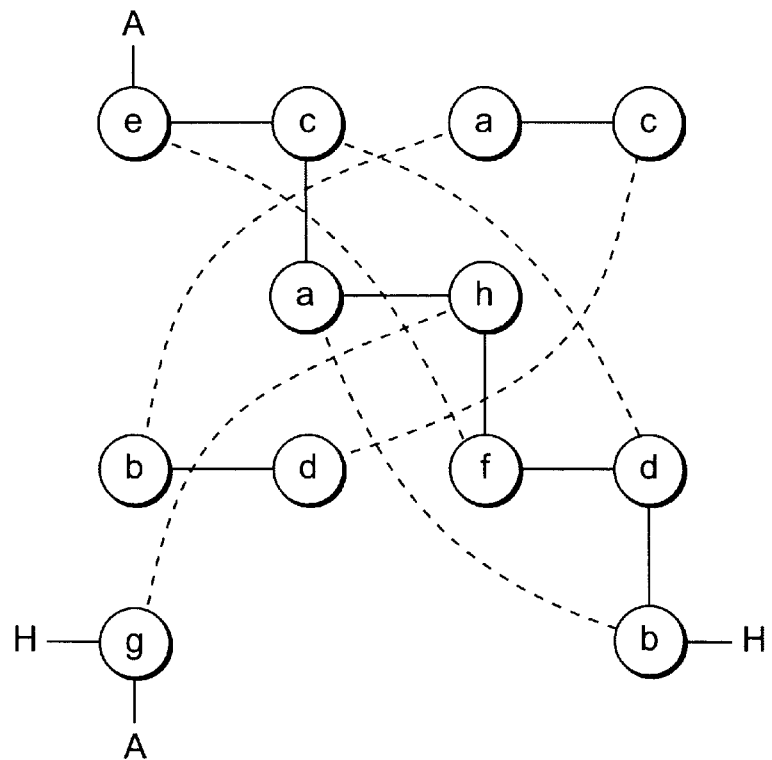
Figure 15L:
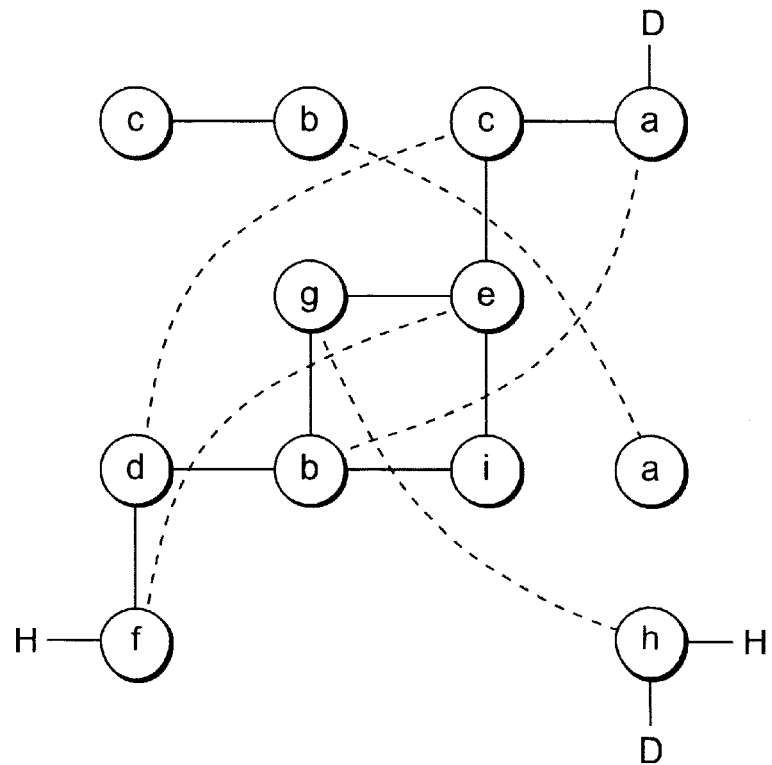
Figure 15M:
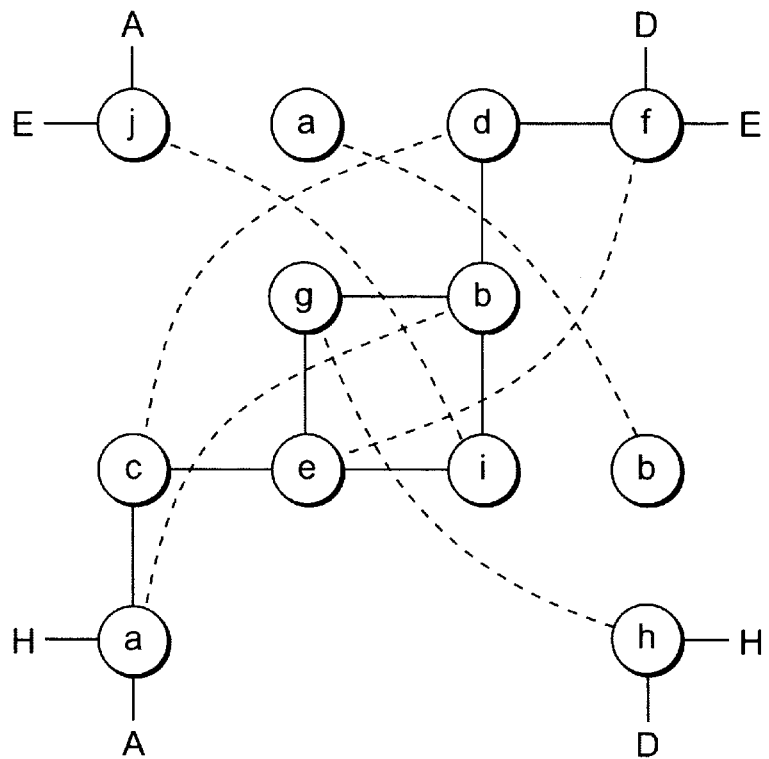
Figure 15N:
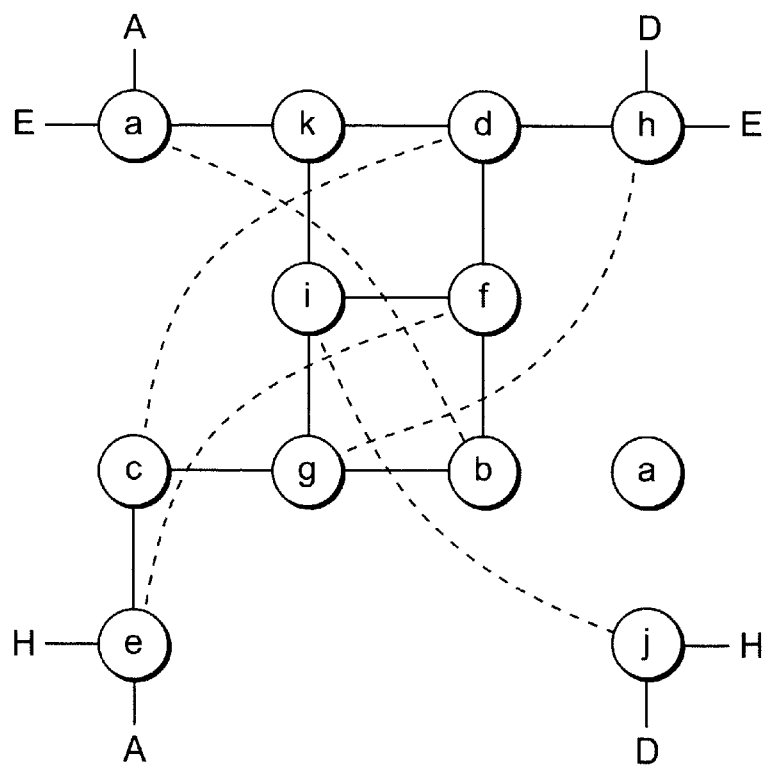

The second topology is depicted in FIG. 15H. FIGS. 5I–5N depict this network divided into subnetworks of six nodes and six nodes, seven nodes and five nodes, eight nodes and four nodes, nine nodes and three nodes, ten nodes and two nodes, and eleven nodes and one node, respectively. This subnetwork with eleven nodes uses the topology depicted in FIG. 14G and uses the following routings:

| FROM\TO | a | b | c | d | e | f | g | h | i | j | k |
|---|---|---|---|---|---|---|---|---|---|---|---|
| a |  | — | e | e, c | — | e | h | — | e, j | e | — |
| b | — |  | f, d | f | f | — | — | g | f | f, i | a |
| c | g, b | g |  | — | — | e | — | g | e, j | e | d |
| d | h | h, a | — |  | — | f | — | h | — | f | f, i | — |
| e | — | a | — | c |  | — | — | c | a | j | — | a |
| f | b | — | d | — | — |  | — | b | d | — | i | d |
| g | b | — | — | c | c | i |  | — | — | — | i | i |
| h | — | a | d | — | j | d | — |  | — | j | — | a |
| i | g, b | g | g | b, c | f | — | — | g |  | — | — |
| j | h | h, a | h, d | h | — | e | h | — | — |  | i |
| k | — | a | d | — | a | i | i | a | — | i |  |

Basic Topologies for Networks With Thirteen Nodes

Figure 16A:
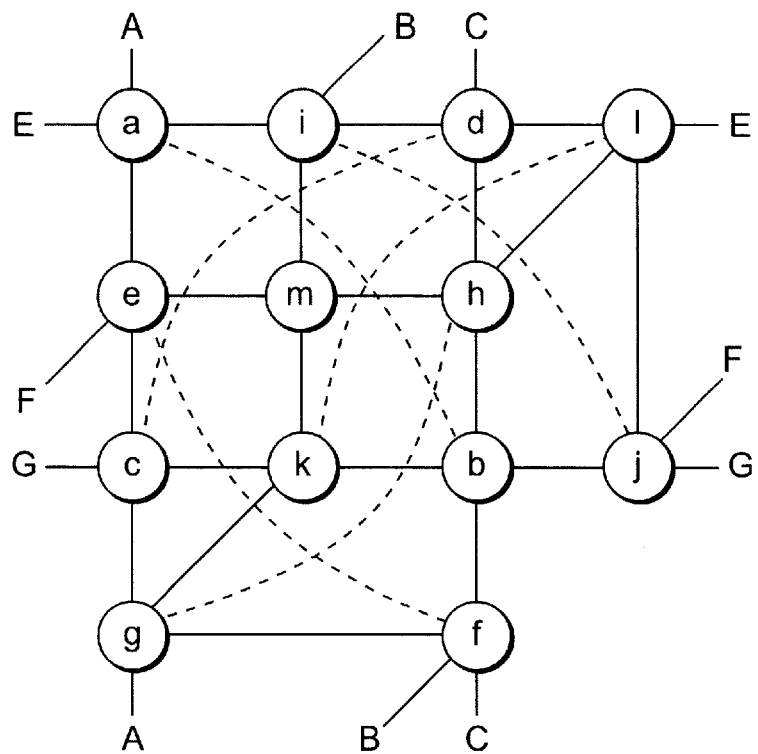
FIG. 16A depicts a network with 13 nodes in accordance with methods and systems consistent with the present invention.
Figure 16B:
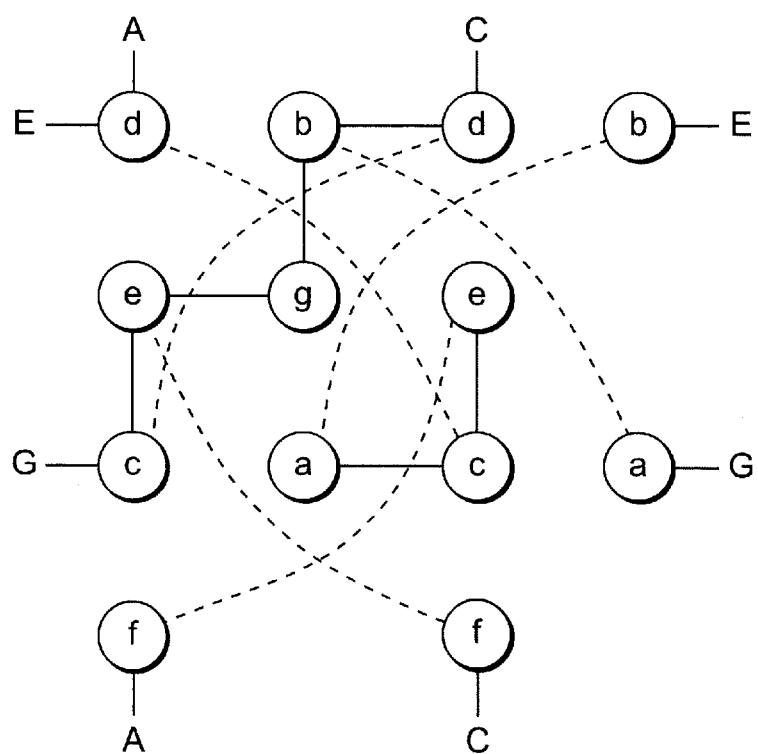
FIGS. 16B–16G depict partitionings of the network in FIG. 16A.
Figure 16C:
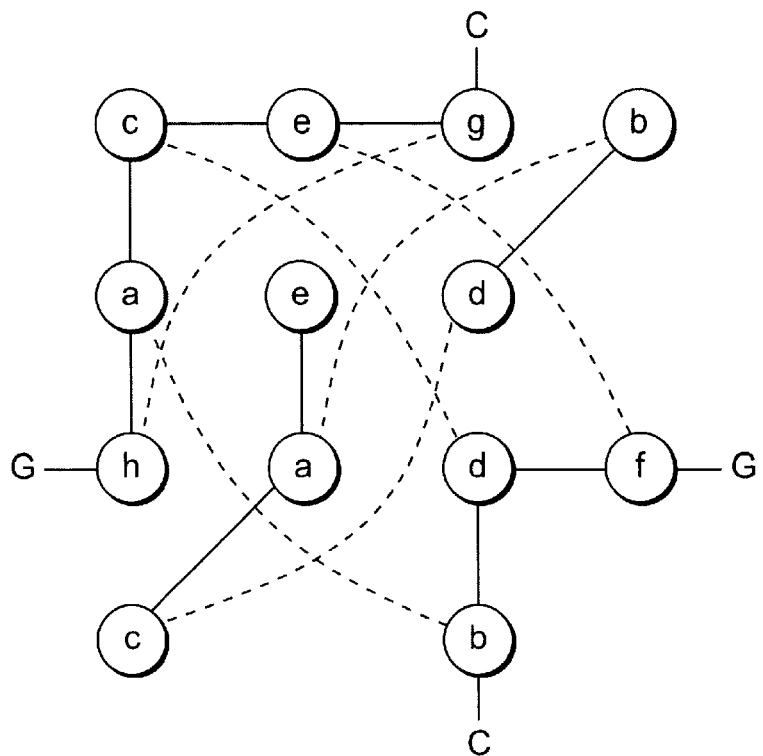
Figure 16D:
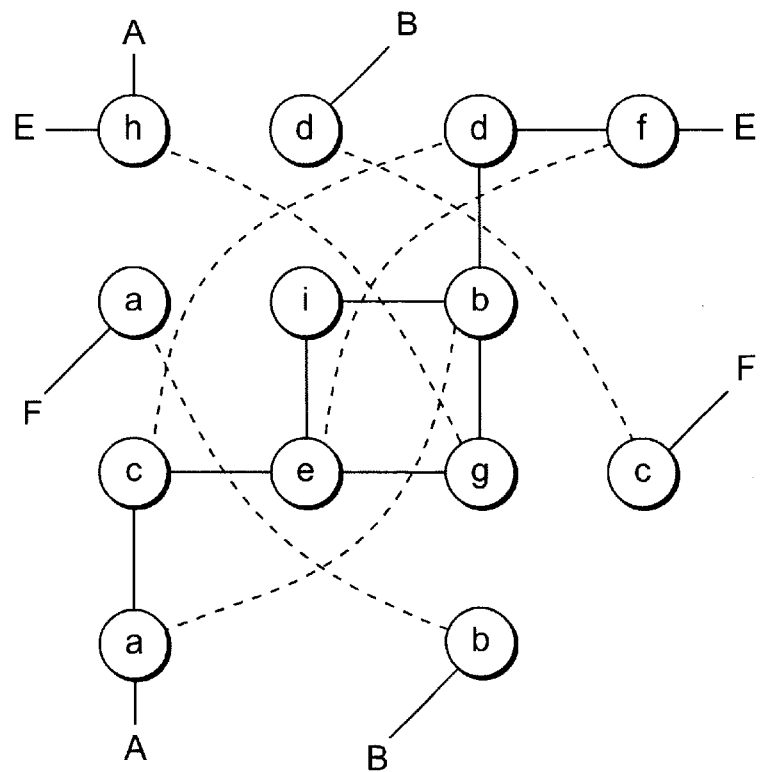
Figure 16E:
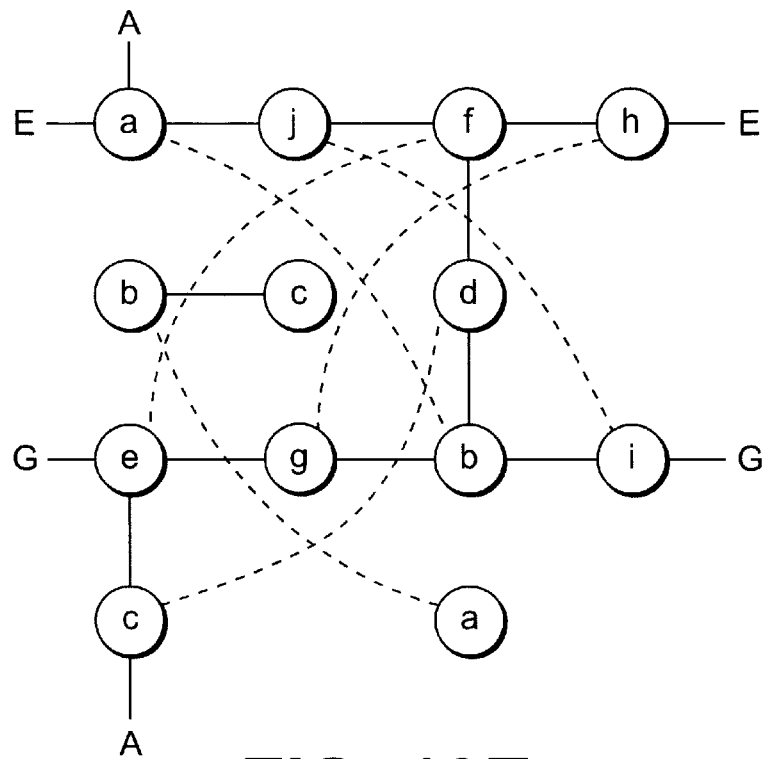
Figure 16F:
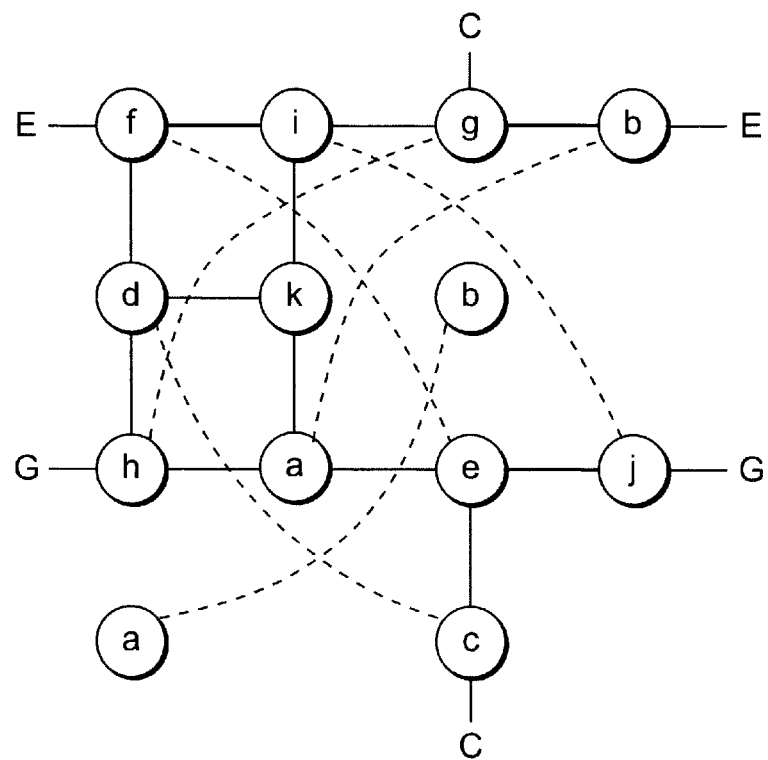
Figure 16G:
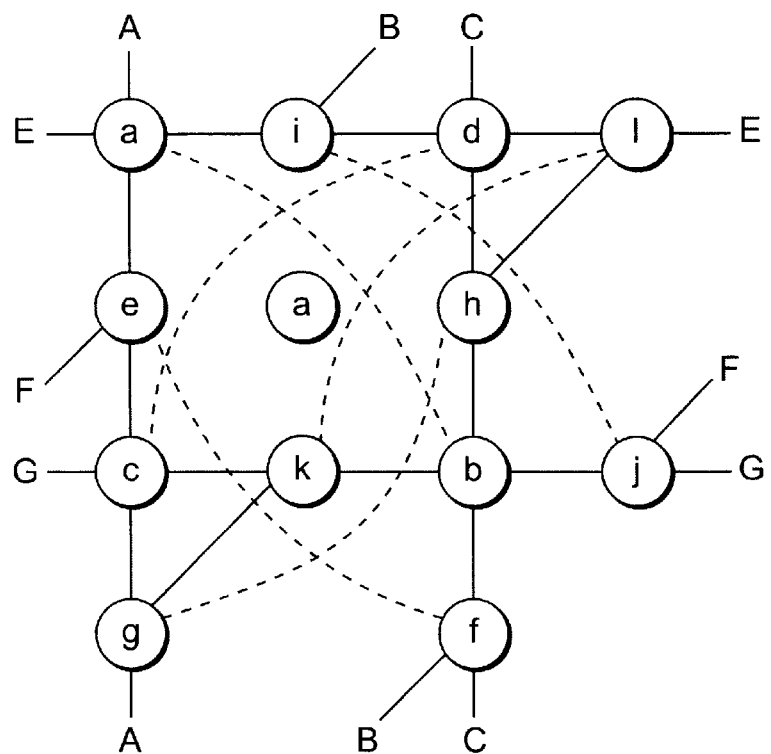

There are two basic topologies for networks with thirteen nodes, the first of which is depicted in FIG. 16A. FIGS. 16B–16G depict this network divided into subnetworks of seven nodes and six nodes, eight nodes and five nodes, nine nodes and four nodes, ten nodes and three nodes, eleven nodes (the subnetwork in FIG. 14G) and two nodes, and twelve nodes (the subnetwork in FIG. 15A) and one node, respectively. The subnetwork with twelve nodes uses the following routings:

| FROM\TO | a | b | c | d | e | f | g | h | i | j | k | l |
|---|---|---|---|---|---|---|---|---|---|---|---|---|
| a |  | — | e | i | — | e | — | g | — | i | l | — |
| b | — |  | j | f | f | — | h | — | j | — | — | k |
| c | g | k |  | — | — | e | — | g | j | — | — | k |
| d | l | h | — |  | — | f | — | h | — | — | i | l | — |
| e | — | a | — | c |  | — | — | a | a, g | j | — | a, l | a |
| f | b | — | d | — | — |  | — | b, h | b | — | i | b | b, k |
| g | — | a | — | c | c | c, e |  | — | — | c, j | c | — | k |
| h | b | — | d | — | d, f | d | — |  | d | d, i | l | — |
| i | — | a | d | — | f | — | a | a, g |  | — | a, l | a |
| j | b | — | — | c | — | e | b, h | b | — |  | b | b, k |
| k | b | — | — | c | c | c, e | — | g | c, j | c |  | — |
| l | — | a | d | — | d, f | d | h | — | d | d, i | — |  |

Figure 16H:
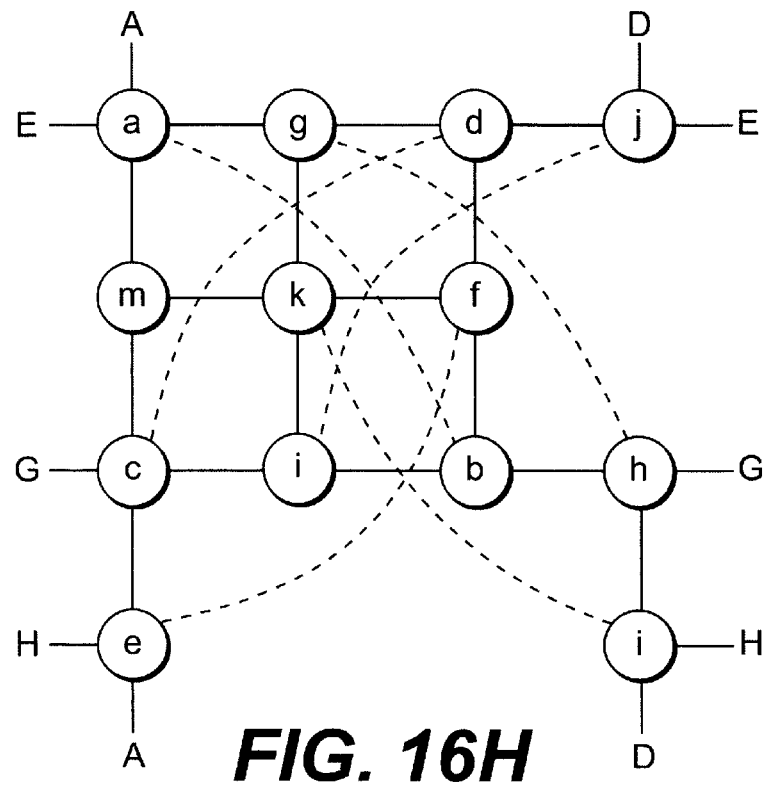
FIG. 16H depicts an alternative configuration for a network with 13 nodes in accordance with methods and systems consistent with the present invention.
Figure 16I:
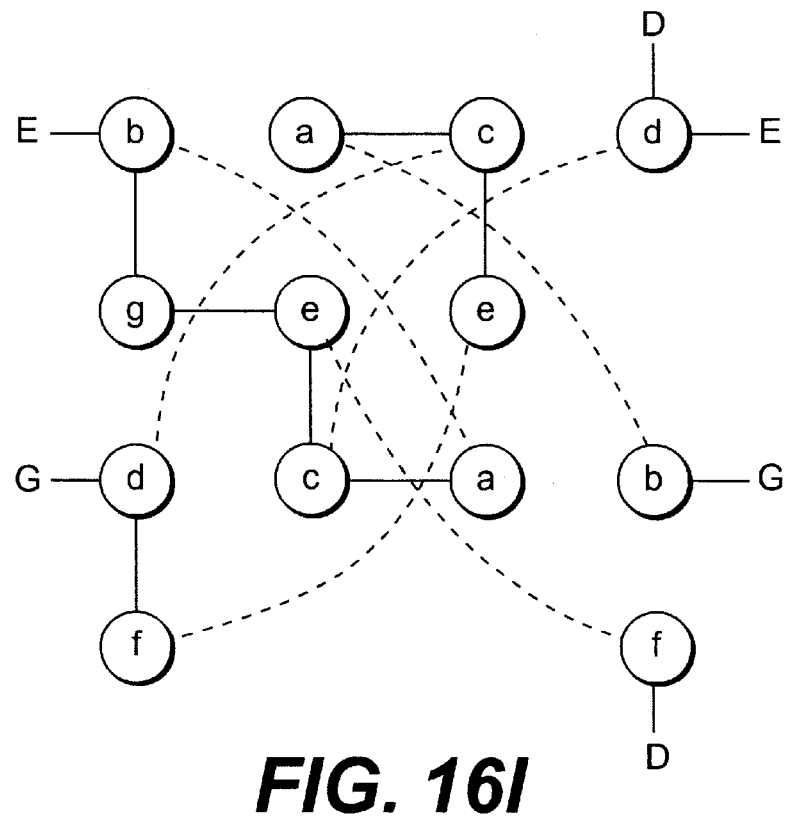
FIGS. 16I–16N depict partitionings of the network in FIG. 16H.
Figure 16J:
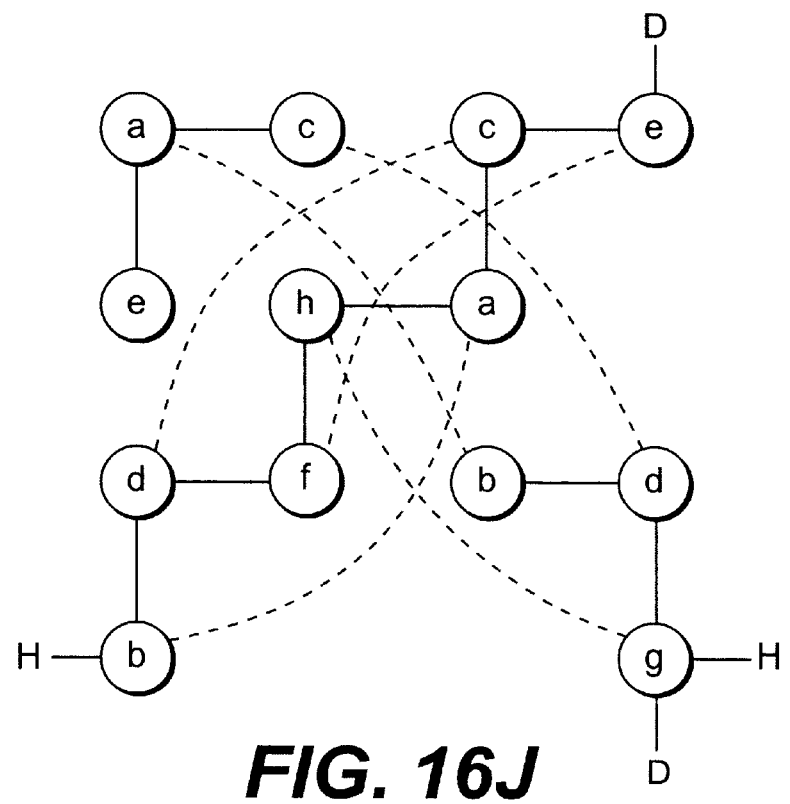
Figure 16K:
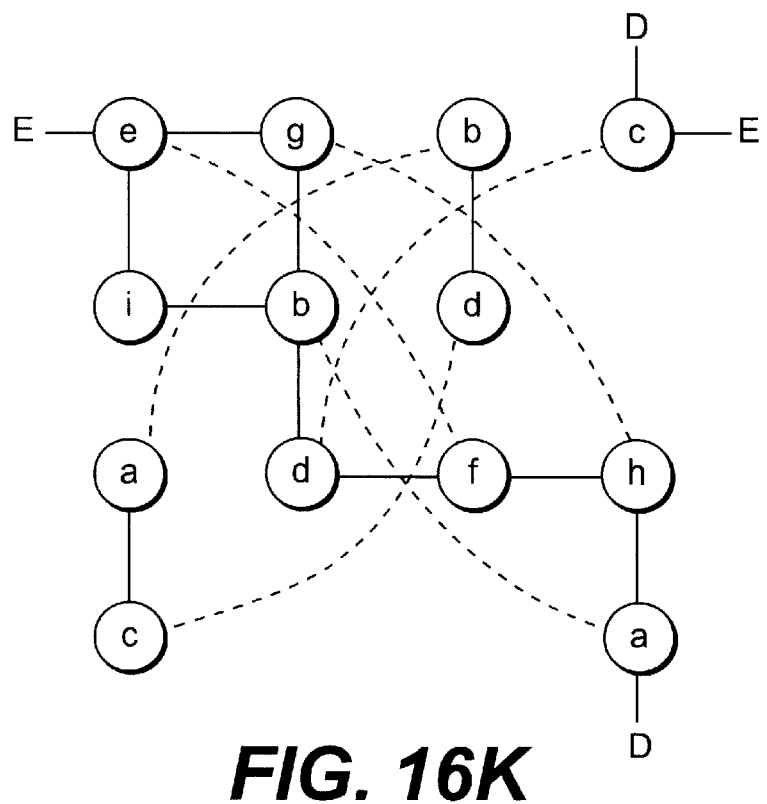
Figure 16L:
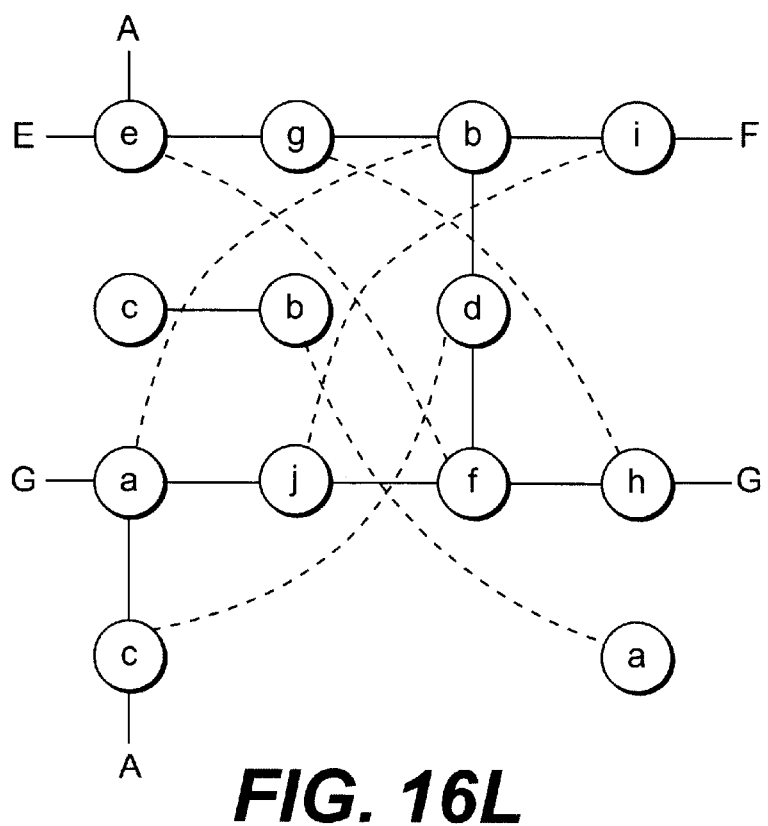
Figure 16M:
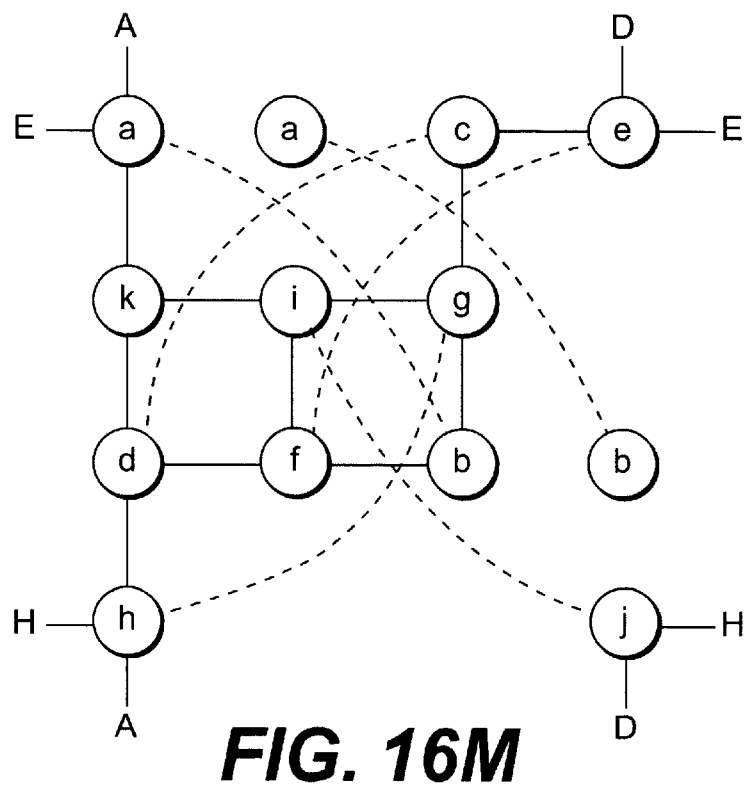
Figure 16N:
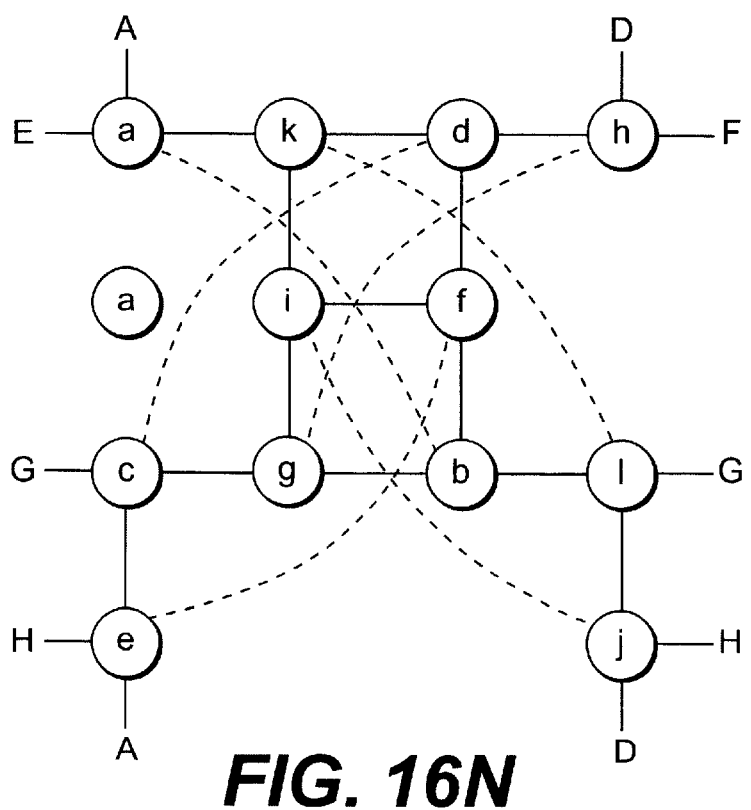

The second topology is depicted in FIG. 16H. FIGS. 16I–16N depict this network subdivided into subnetworks of seven nodes and six nodes, eight nodes and five nodes, nine nodes and four nodes, ten nodes and three nodes, eleven nodes (the subnetwork in FIG. 14G) and two nodes, and twelve nodes (the subnetwork in FIG. 15H) and one node, respectively. This subnetwork with twelve nodes uses the following routings:

| FROM\TO | a | b | c | d | e | f | g | h | i | j | k | l |
|---|---|---|---|---|---|---|---|---|---|---|---|---|
| a |   | — | e | k | — | e | h | — | k | e | — | k |
| b | — |   | l | f | f | — | — | g | f | l | l | — |
| c | g, b | g |   | — | — | e | — | g | e, j | e | l | — |
| d | h | h, a | — |   | f | — | h | — | f | f, i | — | k |
| e | — | a | — | c |   | — | a, h | a | j | — | a | c |
| f | b | — | d | — | — |   | b | b, g | — | i | d | b |
| g | b | — | — | c | c | i |   | — | — | i | i | c |
| h | — | a | d | — | j | d | — |   | j | — | d | j |
| i | g, b | g | g | k | f | — | — | g |   | — | — | k |
| j | h | h, a | l | h | — | e | h | — | — |   | l | — |
| k | — | a | d | — | i, f | i | a, h | a | — | i |   | — |
| l | b | — | — | c | j | j, e | b | b, g | j | — | — |   |

Basic Topology for Networks With Fourteen Nodes

FIG. 17A depicts the basic topology of networks with fourteen nodes. FIGS. 17B–17H depict this topology partitioned into subnetworks of seven nodes and seven nodes, eight nodes and six nodes, nine nodes and five nodes, ten nodes and four nodes, eleven nodes (the subnetwork in FIG. 14G) and three nodes, twelve nodes (the subnetwork in FIG. 15H) and two nodes, and thirteen nodes (the subnetwork in FIG. 16H) and one node, respectively. This subnetwork with thirteen nodes uses the following routings:

Basic Topologies for Networks With Fifteen Nodes

FIG. 18A depicts the basic topology for fifteen nodes. FIGS. 18B–18H depict networks subdivided into partitions of eight nodes and seven nodes, nine nodes and six nodes, ten nodes and five nodes, eleven nodes (the subnetwork in FIG. 14G) and four nodes, twelve nodes (the subnetwork in FIG. 15H) and three nodes, thirteen nodes (the subnetwork in FIG. 16H) and two nodes, and fourteen nodes and one node, respectively. The subnetwork with fourteen nodes uses the following routings:

| FROM\TO | a | b | c | d | e | f | g | h | i | j | k | l | m |
|---|---|---|---|---|---|---|---|---|---|---|---|---|---|
| a |   | — | e | g | — | e | — | g | j | — | g | e | — |
| b | — |   | h | f | f | — | h | — | — | i | f | h | a |
| c | i, b | i |   | — | — | e | h | — | i | e, l | e | — | — |
| d | j | j, a | — |   | f | — | — | g | j | — | f | f, k | c |
| e | — | a | — | c |   | — | a | c | a, j | a | l | — | a |
| f | b | — | d | — | — |   | d | b | b | b, i | — | k | k |
| g | — | a | d | — | k, f | k | — | — | a, j | a | — | k | a |
| h | b | — | — | c | l | l, e | — |   | b | b, i | l | — | c |
| i | b | — | — | c | c | k | k | c |   | — | — | k | c |
| j | — | a | d | — | l | d | d | l | — |   | l | — | a |
| k | i, b | i | i | g | f | — | — | g | i | — |   | — | — |
| l | j | j, a | h | j | — | e | h | — | j | — | — |   | k |
| m | — | a | — | c | c | k | k | c | c | a | — | k |   |

| FROM\TO | a | b | c | d | e | f | g | h | i | j | k | l | m | n |
|---|---|---|---|---|---|---|---|---|---|---|---|---|---|---|
| a |   | — | g | i | — | e | — | g | — | i | l | — | i | g |
| b | — |   | j | h | f | — | h | — | j | — | — | k | h | j |
| c | e | k |   | — | — | e | — | g | j | — | — | k | e | g |
| d | l | f | — |   | f | — | h | — | — | i | l | — | h | f |
| e | — | a | — | c |   | — | c | m | m | c | c | a | — | m |
| f | b | — | d | — | — |   | n | d | d | n | b | d | n | — |
| g | — | a | — | c | a | a, e |   | — | a | c | a, l | a | n | — |
| h | b | — | d | — | b, f | b | — |   | d | b | b | b, k | — | m |
| i | — | a | d | — | a | a, e | m, h | m |   | — | a, l | a | — | m |
| j | b | — | — | c | b, f | b | n | n, g | — |   | b | b, k | n | — |
| k | b | — | — | c | m | m, e | c | m | m | c |   | — | — | — |
| l | — | a | d | — | n, f | n | n | d | d | n | — |   | n | — |
| m | e | k | k | i | — | e | h | — | — | i | — | k |   | — |
| n | l | f | j | l | f | — | — | g | j | — | l | — | — |   |

Basic Topology for Networks With Sixteen Nodes

FIG. 19A depicts the basic topology for networks with sixteen nodes. FIGS. 19B–19I depict this network subdivided into partitions of eight nodes and eight nodes, nine nodes and seven nodes, ten nodes and six nodes, eleven nodes (the subnetwork in FIG. 14G) and five nodes, twelve nodes (the subnetwork in FIG. 15H) and four nodes, thirteen nodes (the subnetwork in FIG. 16H) and three nodes, fourteen nodes and two nodes, and fifteen nodes and one node, respectively. This subnetwork with fifteen nodes uses the following routings:

| FROM\TO | a | b | c | d | e | f | g | h | i | j | k | l | m | n | o |
|---|---|---|---|---|---|---|---|---|---|---|---|---|---|---|---|
| a |   | — | g | i | — | e | — | g | — | i | l | — | i | g | g |
| b | — |   | j | h | f | — | h | — | j | — | — | k | h | j | f |
| c | e | k |   | — | — | e | — | g | j | — | — | k | e | g | g |
| d | l | f | — |   | f | — | h | — | — | i | l | — | h | f | f |
| e | — | a | — | c |   | — | c | m | m | c | c | a | — | m | f |
| f | b | — | d | — | — |   | n | d | d | n | b | d | n | — | — |
| g | — | a | — | c | a | a, e |   | — | a | c | a, l | a | n | — | — |
| h | b | — | d | — | b, f | b | — |   | d | b | b | b, k | — | m | g |
| i | — | a | d | — | a | a, e | m, h | m |   | — | a, l | a | — | m | — |
| j | b | — | — | c | b, f | b | n | n, g | — |   | b | b, k | n | — | i |
| k | b | — | — | c | m | m, e | c | m | m | c |   | — | — | m | — |
| l | — | a | d | — | n, f | n | n | d | d | n | — |   | n | — | k |
| m | e | k | k | i | — | e | h | — | — | i | — | k |   | — | k |
| n | l | f | j | l | f | — | — | g | j | — | l | — | — |   | f |
| o | i | k | g | i | f | — | — | g | — | i | — | k | i | g |   |

Although the subnetwork with thirteen nodes depicted in FIG. 16A was not used to partition the networks with fourteen, fifteen, or sixteen nodes, one skilled in the art will appreciate that in an alterative embodiment, this subnetwork could be used. In particular, it is used as a pattern to match the basic topology of 13 nodes from copending U.S. patent application Ser. No. 09/323,963, entitled "Improved Network Topologies" which has been previously incorporated by reference. In this case, the subnetwork would utilize the following routings:

| FROM\TO | a | b | c | d | e | f | g | h | i | j | k | l | m |
|---|---|---|---|---|---|---|---|---|---|---|---|---|---|
| a |   | — | e | i | — | e | — | g | — | i | l | — | e |
| b | — |   | j | f | f | — | h | — | j | — | — | k | h |
| c | g | k |   | — | — | e | — | g | j | — | — | k | k |
| d | l | h | — |   | f | — | h | — | — | i | l | — | h |
| e | — | a | — | c |   | — | a | m | j | — | m | a | — |
| f | b | — | d | — | — |   | — | g | — | i | b | d | i |
| g | — | a | — | c | f | — |   | — | a | c | — | k | k |
| h | b | — | d | — | m | d | — |   | d | l | l | — | — |
| i | — | a | d | — | f | — | a | m |   | — | m | a | — |
| j | b | — | — | c | — | e | c | b | — |   | l | — | e |
| k | b | — | — | c | c | g | — | g | m | c |   | — | — |
| l | — | a | d | — | a | d | h | — | j | — | — |   | h |
| m | i | k | e | i | — | e | h | — | — | i | — | k |   |

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a data processing system with a number of nodes N, wherein N is greater than 4, the method comprising the steps of:

receiving an indication of a first number of nodes and a second number of nodes, wherein the first number of nodes and the second number of nodes are capable of being any number from 1 to N−1 as long as the first number of nodes and the second number of nodes sum to N;

partitioning the nodes into a first subnetwork having the first number of nodes and a second subnetwork having the second number of nodes; and recursively partitioning the nodes into additional subnetworks in an unconstrained manner.

2. A method in a data processing system with a number of nodes N, wherein N is greater than 4, the method comprising the steps of:

receiving an indication of a first number of nodes and a second number of nodes, wherein the first number of nodes and the second number of nodes are capable of being any number from 1 to N−1 as long as the first number of nodes and the second number of nodes sum to N;

partitioning the nodes into a first subnetwork having the first number of nodes and a second subnetwork having the second number of nodes and routing traffic through the first subnetwork such that deadlock is-avoided.

3. The method of claim 2, wherein the routing step includes:
    using a static routing table to route the traffic.
4. A method in a distributed system having a network with nodes, comprising the steps of:
    partitioning the network into a plurality of subnetworks in an unconstrained manner;
    providing each of the subnetworks with a routing table that avoids deadlock in routing traffic in each subnetwork; and
    routing traffic through each of the subnetworks using the routing tables such that deadlock is avoided.
5. A method in a distributed system having a network with nodes, comprising the steps of:
    partitioning the network into a plurality of subnetworks recursively;
    providing each of the subnetworks with a routing table that avoids deadlock in routing traffic in each subnetwork; and
    routing traffic through each of the subnetworks using the routing tables such that deadlock is avoided.
6. A method in a distributed system having a network with nodes that route network traffic using routing tables, the method comprising the steps of:
    receiving an indication of a first number of nodes representing a first partition and a second number of nodes representing a second partition, wherein the first number and the second number of nodes are unconstrained;
    suspending routing operation of the nodes;
    determining which of the nodes form the first partition and which of the nodes form the second partition based on the first number and the second number of nodes;
    modifying the routing tables of the nodes forming the first partition and of the nodes forming the second partition; and
    resuming routing operation of the nodes such that the nodes route network traffic using the modified routing tables and avoid deadlock.
7. An administrative node of a network containing a number of nodes N, wherein N is greater than 4, comprising:
    a memory comprising routing software having first code that receives an indication of a first number of nodes and an indication of a second number of nodes, the first number and the second number of nodes being unconstrained such that the first number and the second number are capable of being any number between 1 and N−1 as long as the first number and the second number sum to N, and having second code for partitioning the network into a first partition with the first number of nodes and a second partition with the second number of nodes; and
    a processor for running the routing software,
    wherein the memory further includes routing tables, and wherein the routing software includes third code that sends the routing tables to the nodes to facilitate routing network traffic.
8. The administrative node of claim 7, wherein the routing tables avoid deadlock when used for routing traffic.
9. The administrative node of claim 7, wherein at least two of the nodes are partner nodes and wherein the second code of the routing software partitions the network such that the partner nodes are in a same partition.
10. A computer-readable medium containing instructions for controlling a data processing system to perform a method, the data processing system having a number of nodes N, wherein N is greater than 4, the method comprising the steps of:
    receiving an indication of a first number of nodes and a second number of nodes, wherein the first number of nodes and the second number of nodes are capable of being any number from 1 to N−1 as long as the first number of
    determining which of the nodes form the first partition and which of the nodes form the second partition based on the first number and the second number of nodes;
    nodes and the second number of nodes sum to N;
    partitioning the nodes into a first subnetwork having the first number of nodes and a second subnetwork having the second number of nodes; and
    recursively partitioning the nodes into additional subnetworks in an unconstrained manner.
11. A computer-readable medium containing instructions for controlling a data processing system to perform a method, the data processing system having a number of nodes N, wherein N is greater than 4, the method comprising the steps of:
    receiving an indication of a first number of nodes and a second number of nodes, wherein the first number of nodes and the second number of nodes are capable of being any number from 1 to N−1 as long as the first number of
    determining which of the nodes form the first partition and which of the nodes form the second partition based on the first number and the second number of nodes;
    nodes and the second number of nodes sum to N;
    partitioning the nodes into a first subnetwork having the first number of nodes and a second subnetwork having the second number of nodes; and
    routing traffic through the first subnetwork such that deadlock is avoided.
12. The computer-readable medium of claim 11, wherein the routing step includes: using a static routing table to route the traffic.
13. A computer-readable medium containing instructions for controlling a distributed system to perform a method, the distributed system having a network with nodes, the method comprising the steps of:
    partitioning the network into a plurality of subnetworks in an unconstrained manner;
    providing each of the subnetworks with a routing table that avoids deadlock; and
    routing traffic through each of the subnetworks using the provided routing tables such that deadlock is avoided.
14. A computer-readable medium containing instructions for controlling a distributed system to perform a method, the distributed system having a network with nodes, the method comprising the steps of:
    partitioning the network into a plurality of subnetworks recursively;
    providing each of the subnetworks with a routing table that avoids deadlock; and
    routing traffic through each of the subnetworks using the provided routing tables such that deadlock is avoided.
15. A data processing system with a number of nodes N, wherein N is greater than 4, the data processing system comprising:
    means for receiving an indication of a first number of nodes and a second number of nodes, wherein the first number of nodes and the second number of nodes are capable of being any number from 1 to N−1 as long as the first number of nodes and the second number of nodes sum to N;

means for partitioning the nodes into a first subnetwork having the first number of nodes and a second subnetwork having the second number of nodes; and means for recursively partitioning the nodes into additional subnetworks in an unconstrained manner.

16. A data processing system with a number of nodes N, wherein N is greater than 4, the data processing system comprising:

means for receiving an indication of a first number of nodes and a second number of nodes, wherein the first number of nodes and the second number of nodes are capable of being any number from 1 to N−1 as long as the first number of nodes and the second number of nodes sum to N;

means for partitioning the nodes into a first subnetwork having the first number of nodes and a second subnetwork having the second number of nodes; and means for routing traffic through the first subnetwork such that deadlock is avoided.

* * * * *

UNITED STATES PATENT AND TRADEMARK OFFICE
CERTIFICATE OF CORRECTION

PATENT NO. : 6,631,421 B1  Page 1 of 1
DATED : October 7, 2003
INVENTOR(S) : Guy L. Steele, Jr. et al.

It is certified that error appears in the above-identified patent and that said Letters Patent is hereby corrected as shown below:

<u>Title page,</u>
Item [75], Inventors, "Chelmsford," should read -- Acton --;
Item [57], ABSTRACT,
Line 14, "each to subnetwork" should read -- each subnetwork --;

<u>Column 16,</u>
Line 67, "is-avoided." should read -- is avoided. --;

<u>Column 18,</u>
Lines 7-8, "N-1 as long as the first number of" should read -- N-1; --; and
Lines 27-28, "N-1 as long as the first number of" should read -- N-1 --.

Signed and Sealed this

Tenth Day of February, 2004

JON W. DUDAS
*Acting Director of the United States Patent and Trademark Office*